(12) United States Patent
Nobuoka

(10) Patent No.: US 11,381,762 B2
(45) Date of Patent: Jul. 5, 2022

(54) INTEGRATED CIRCUIT CHIP AND IMAGE CAPTURING APPARATUS

(71) Applicant: CANON KABUSHIKI KAISHA, Tokyo (JP)

(72) Inventor: Kosuke Nobuoka, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 22 days.

(21) Appl. No.: 16/922,826

(22) Filed: Jul. 7, 2020

(65) Prior Publication Data

US 2021/0014436 A1  Jan. 14, 2021

(30) Foreign Application Priority Data

Jul. 8, 2019 (JP) .............................. JP2019-127083

(51) Int. Cl.
  *H04N 5/369* (2011.01)
  *H04N 5/353* (2011.01)
  *H04N 5/361* (2011.01)

(52) U.S. Cl.
  CPC ............. *H04N 5/353* (2013.01); *H04N 5/361* (2013.01); *H04N 5/379* (2018.08)

(58) Field of Classification Search
  CPC ........... H04N 5/36961; H04N 5/37457; H04N 5/374; H04N 5/367; H04N 5/353; H04N 5/361; H04N 5/379
  See application file for complete search history.

(56) References Cited

U.S. PATENT DOCUMENTS

| | | | |
|---|---|---|---|
| 2013/0032956 A1* | 2/2013 | Kanou | G03F 9/7084 257/E23.179 |
| 2014/0310442 A1* | 10/2014 | Kimura | G06F 13/4027 710/306 |
| 2017/0195574 A1* | 7/2017 | Wong | H04N 5/23258 |
| 2019/0104260 A1* | 4/2019 | Izuhara | H04N 5/3745 |
| 2019/0104272 A1* | 4/2019 | Izuhara | H04N 5/335 |
| 2021/0014411 A1* | 1/2021 | Chen | G06K 9/00718 |

FOREIGN PATENT DOCUMENTS

JP  2017-183658 A  10/2017

* cited by examiner

*Primary Examiner* — Sinh Tran
*Assistant Examiner* — Zhenzhen Wu
(74) *Attorney, Agent, or Firm* — Cowan, Liebowitz & Latman, P.C.

(57) ABSTRACT

This invention provides an integrated circuit chip comprising a plurality of signal processing circuits formed by stepping exposure, a bus formed by one-shot exposure, an arbitration circuit that arbitrates between the plurality of signal processing circuits and the bus, and an input unit that inputs a captured image signal from an image sensor, wherein the plurality of signal processing circuits formed by stepping exposure includes a processing unit that generates a RAW image by carrying out predetermined signal processing on the captured image signal and outputs the RAW image to the exterior, and a generating unit that generates image evaluation information using the bus formed by one-shot exposure and the arbitration circuit, in addition to the generation of the RAW image.

13 Claims, 23 Drawing Sheets

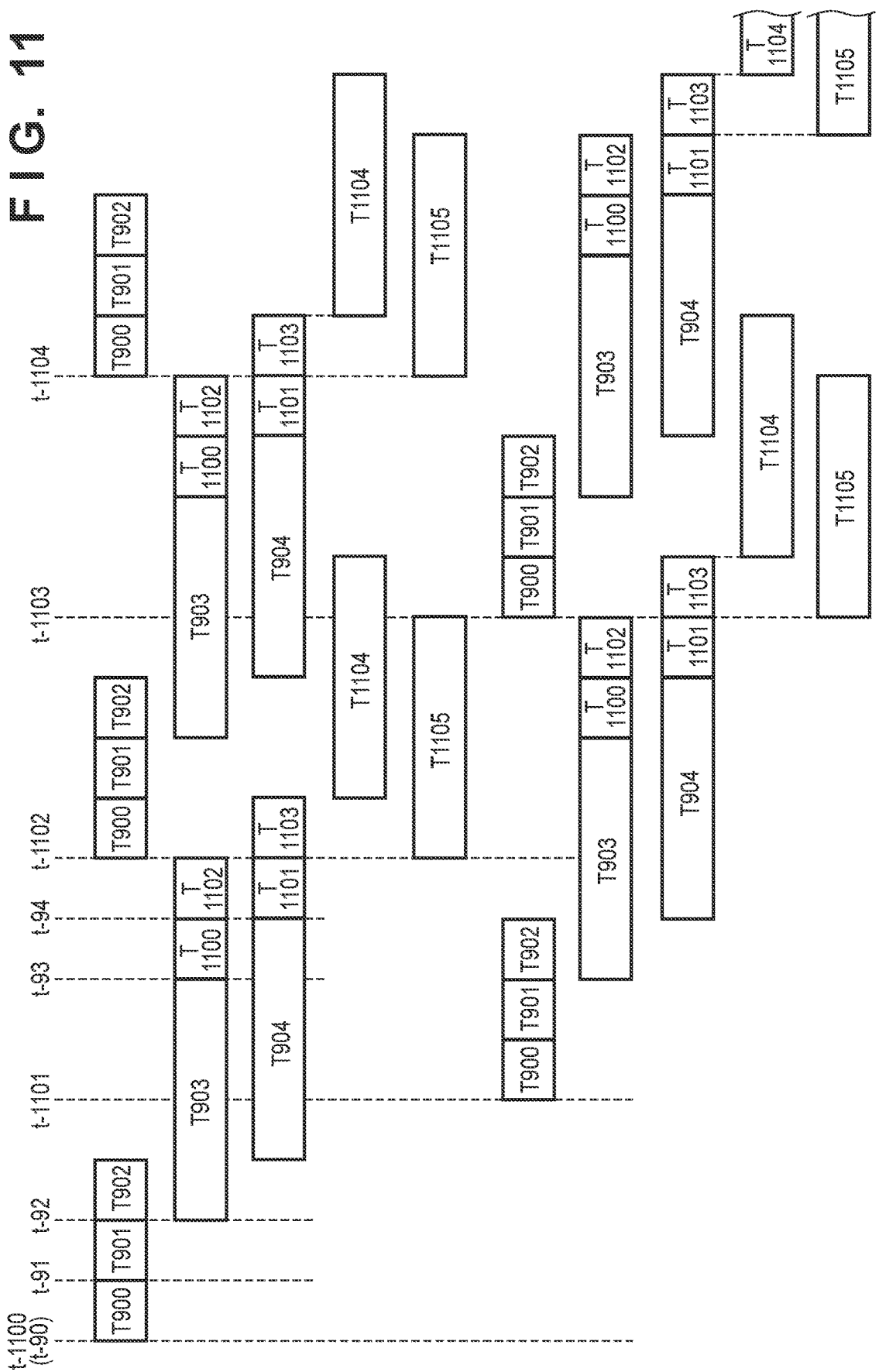

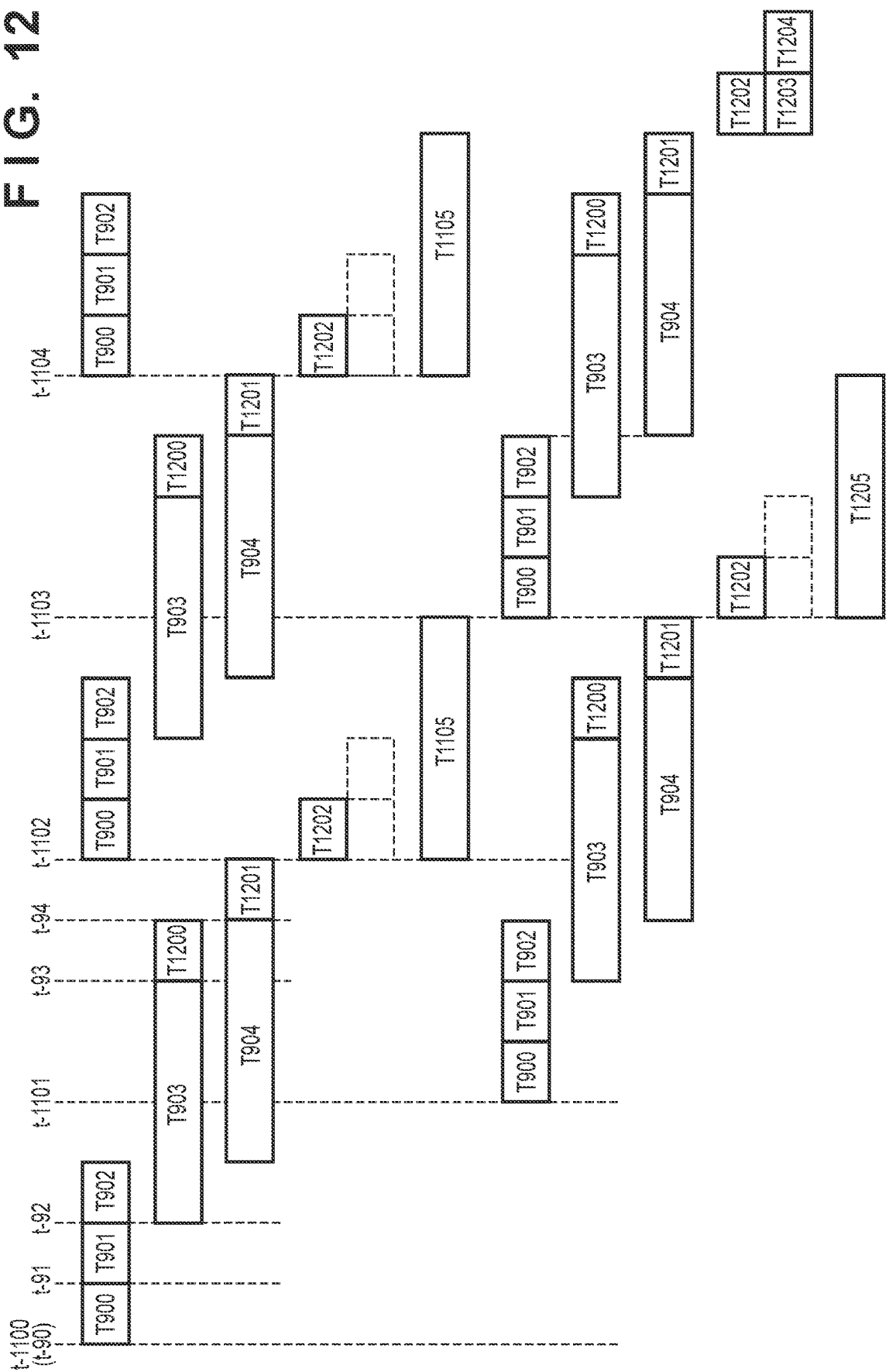

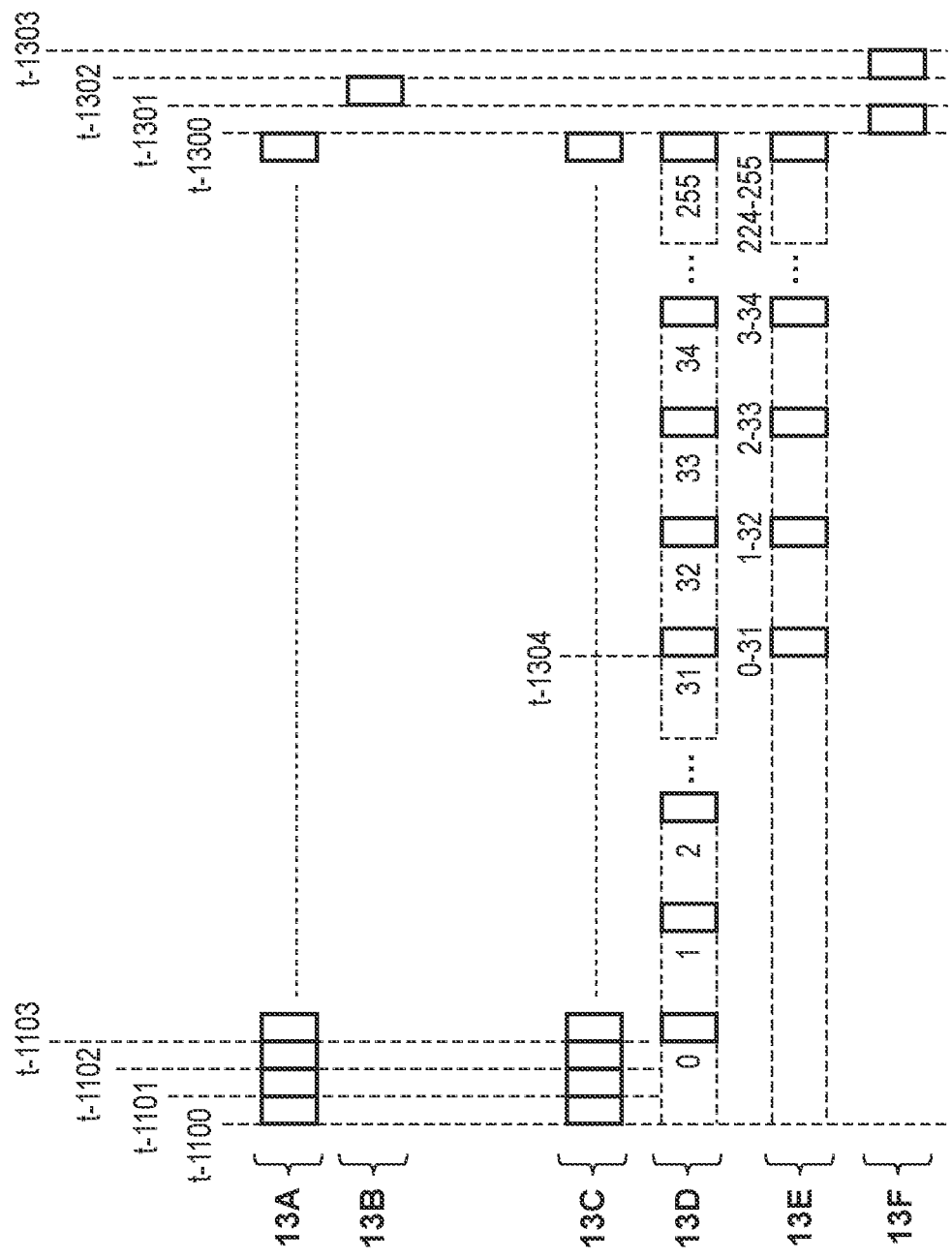

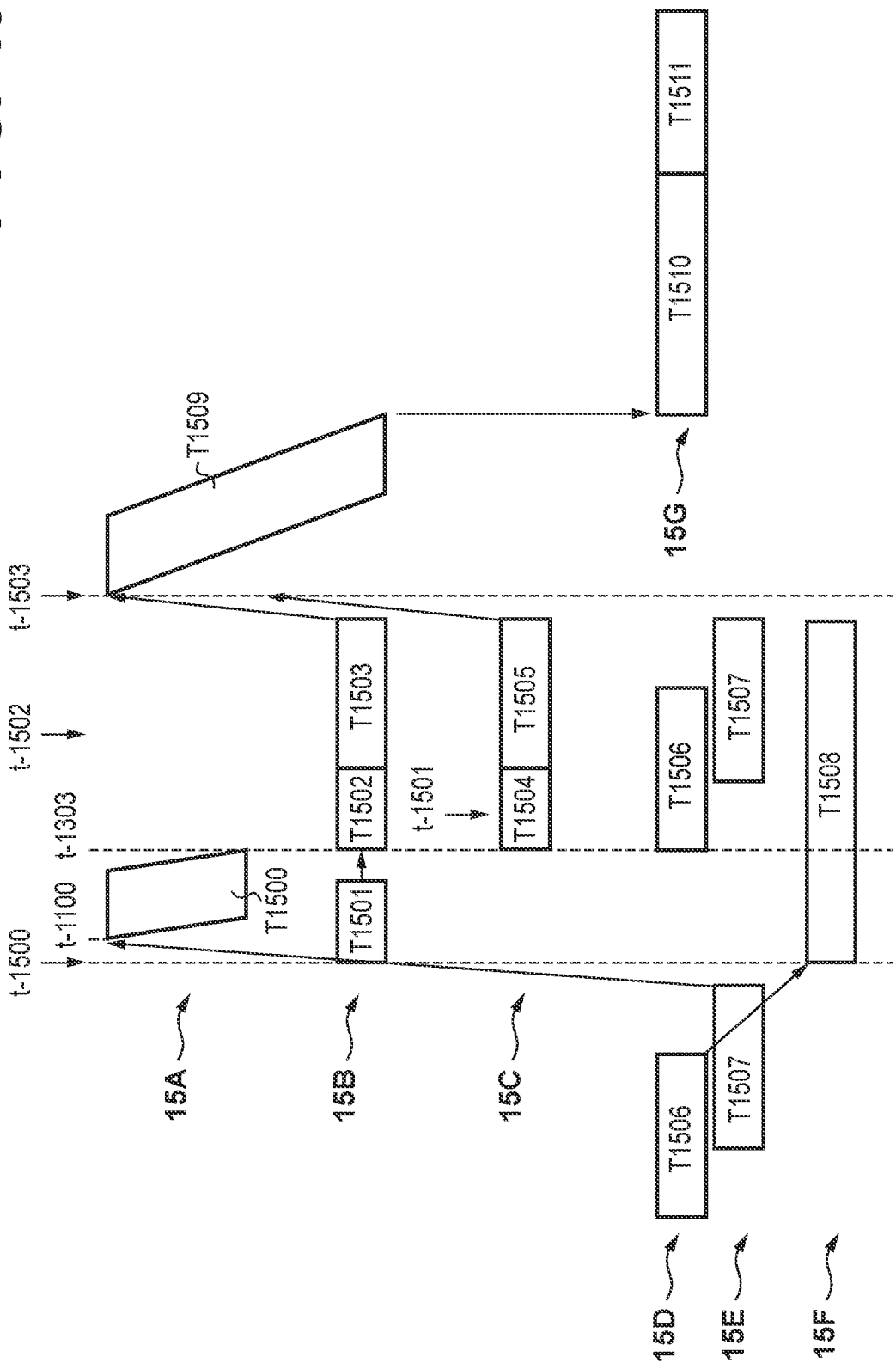

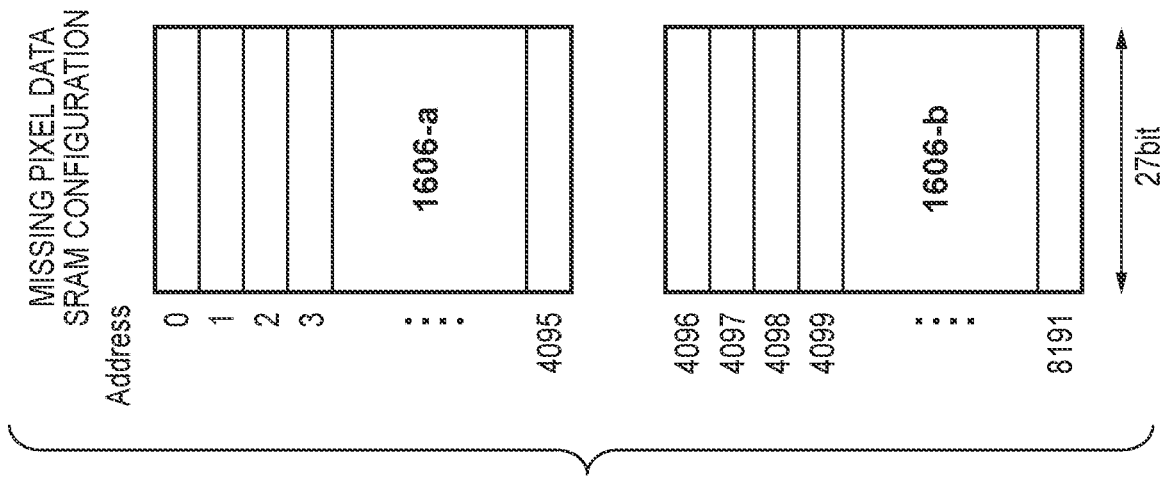
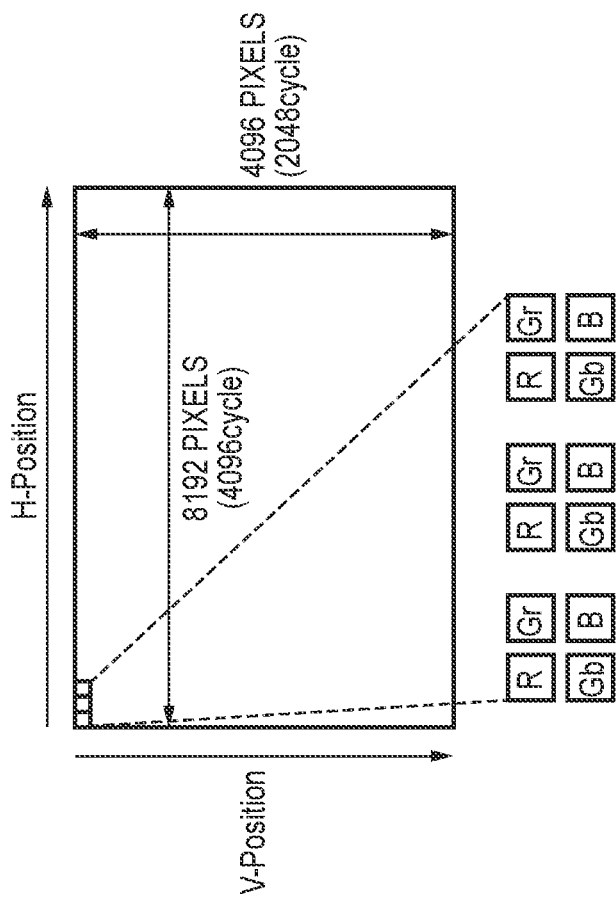
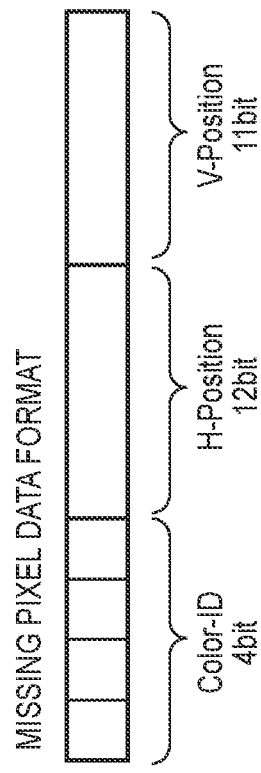
FIG. 17A IMAGE FORMAT
FIG. 17B MISSING PIXEL DATA FORMAT
FIG. 17C MISSING PIXEL DATA SRAM CONFIGURATION

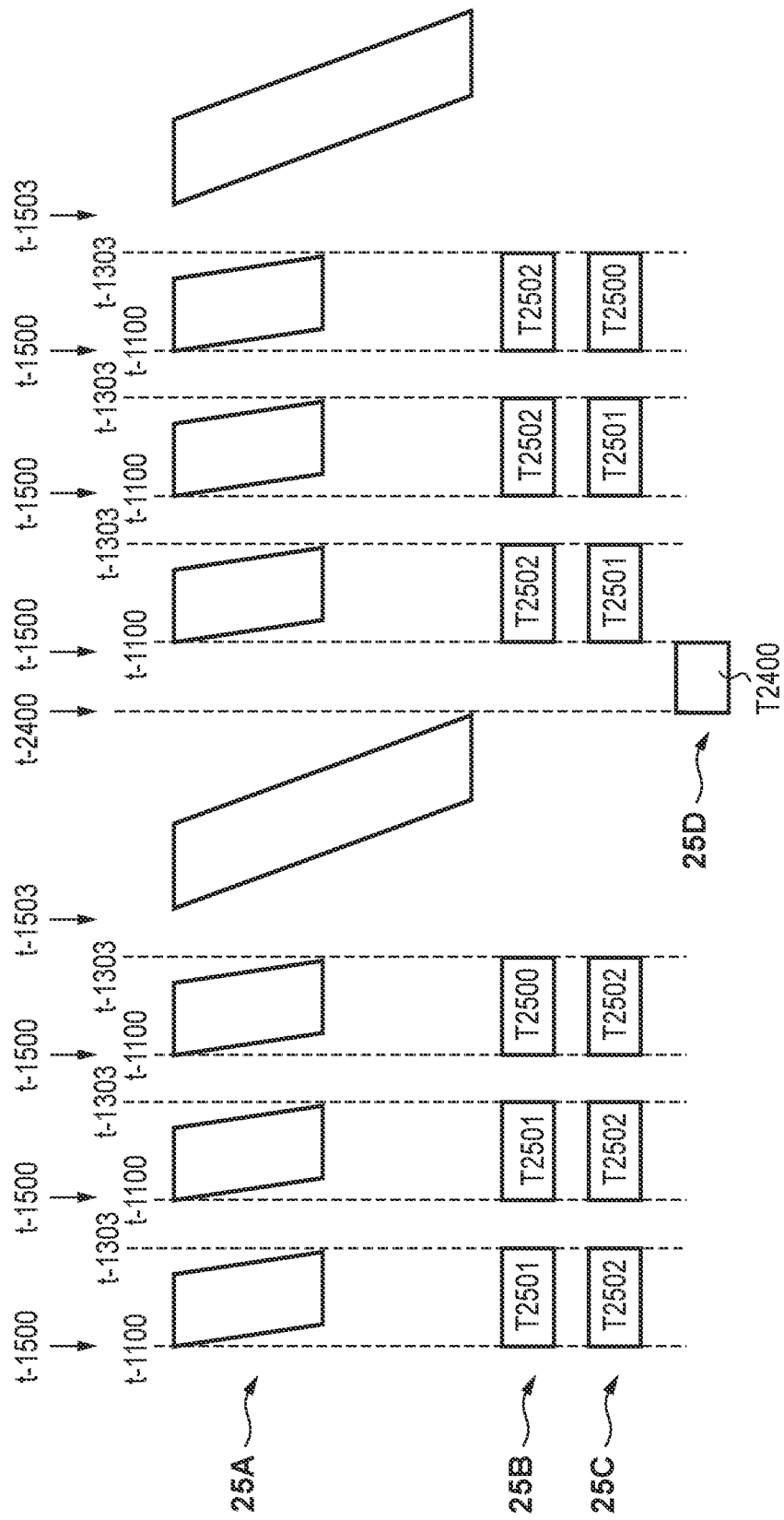
F I G. 25

INTEGRATED CIRCUIT CHIP AND IMAGE CAPTURING APPARATUS

BACKGROUND OF THE INVENTION

Field of the Invention

The present invention relates to an integrated circuit chip and an image capturing apparatus provided with the same.

Description of the Related Art

Stacked image sensor techniques are known, where the freedom with which a pixel readout circuit can be laid out is improved by forming the pixel chip of a CMOS image sensor through a back-surface process, and readout processing speed is improved by layering the pixel chip with a logic chip formed separately.

Recent stacked image sensor logic chips are increasingly using multipath configurations in digital signal processing circuits or being provided with high-capacity memory, which has led to major improvements in the processing performance of the stacked image sensors.

Meanwhile, image capturing apparatuses such as digital cameras are seeing a trend toward larger diameters in shooting lenses, with the aim of higher-quality image capturing performance. Stacked image sensors are being actively developed in so-called "full-size", i.e., 35 mm, CMOS image sensors as well.

On the other hand, with semiconductor exposure devices involved in the manufacture of stacked image sensors, limitations imposed by the resolution range and resolution of a mask pattern mean that the mask pattern cannot be exposed in one shot when the chip has a broad surface area, as is the case with a full-size CMOS image sensor. Stepping exposure, which is carried out over two shots, is therefore necessary.

The logic chips of full-size stacked CMOS image sensors in particular must be manufactured through stepping exposure which prioritizes the resolving power of exposure in order to realize faster speeds and reduced power consumption. This means that digital circuits, memory, and the like having identical specifications will be formed on the left and right of the chip. The circuit is therefore provided only with relatively simple functions, such as AD conversion or image buffering for memory and the like.

In view of such circumstances, Japanese Patent Laid-Open No. 2017-183658 (called simply "Document 1" hereinafter) discloses a technique in which the state of circuit connections is changed by forming an interconnect layer through one-shot exposure upon an interconnect layer and a silicon layer formed through stepping exposure. This makes it possible to implement different functions.

According to the method disclosed in Document 1, there is a risk that the number of interconnects changed in each stepping exposure region by the one-shot exposure interconnects in order to greatly improve the logic functions of the stacked image sensor will become extremely high. It is thus desirable to effectively improve the logic functions of the stacked image sensor through more limited one-shot exposure interconnect formation.

Furthermore, according to the method disclosed in Document 1, it is difficult to unify the power consumed by different functions designed for respective divided regions of the stacked image sensor. As a result, differences arise in the amounts of heat produced in the stepping exposure regions, which has created the risk of differences in temperature-dependent characteristics (dark current noise) arising in the stacked pixel chip.

SUMMARY OF THE INVENTION

To solve this problem, according to an aspect of the invention, there is provided an integrated circuit chip comprising: a plurality of signal processing circuits formed by stepping exposure, a bus formed by one-shot exposure, an arbitration circuit that arbitrates between the plurality of signal processing circuits and the bus, and an input unit that inputs a captured image signal from an image sensor, wherein the plurality of signal processing circuits formed by stepping exposure includes: a processing unit that generates a RAW image by carrying out predetermined signal processing on the captured image signal and outputs the RAW image to the exterior; and a generating unit that generates image evaluation information using the bus formed by one-shot exposure and the arbitration circuit, in addition to the generation of the RAW image.

Further features of the present invention will become apparent from the following description of exemplary embodiments (with reference to the attached drawings).

BRIEF DESCRIPTION OF THE DRAWINGS

FIG. 11 is a diagram illustrating a processing timing chart of the left-side digital signal processing circuit.

FIG. 12 is a diagram illustrating a processing timing chart of the right-side digital signal processing circuit.

FIG. 13 is a processing timing chart of the left-side digital signal processing circuit and the right-side digital signal processing circuit.

FIG. 15 is a diagram illustrating an operation sequence of an image sensor and the image recording apparatus according to the first embodiment.

FIGS. 17A to 17C are diagrams illustrating pixel specifications of an image sensor and a missing pixel data structure.

FIG. 25 is an operation sequence chart of an image sensor and an image recording apparatus according to a fifth embodiment.

DESCRIPTION OF THE EMBODIMENTS

Figure 1:
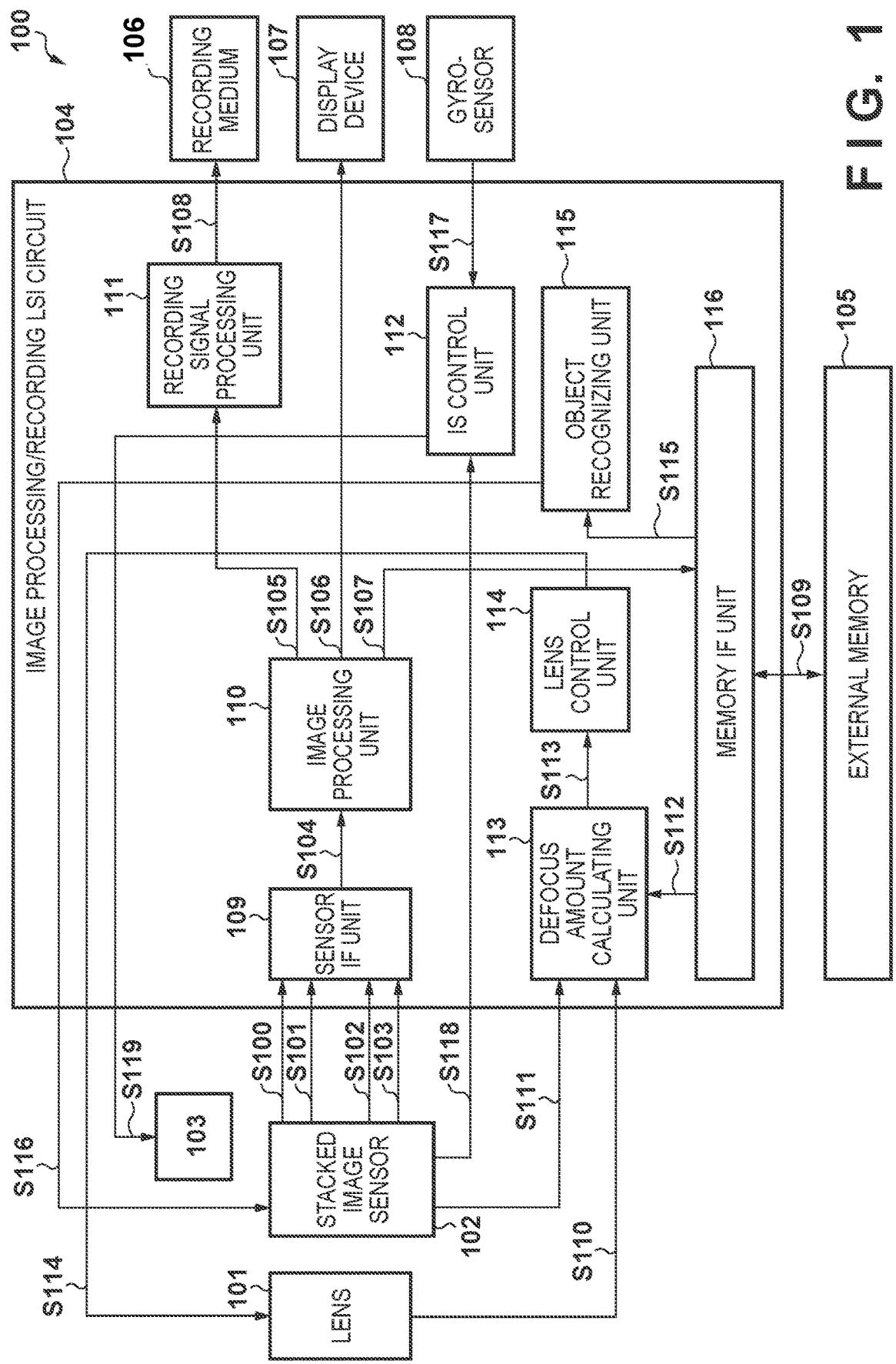
FIG. 1 is a block diagram illustrating an image recording apparatus according to a first embodiment.

Hereinafter, embodiments will be described in detail with reference to the attached drawings. Note, the following embodiments are not intended to limit the scope of the claimed invention. Multiple features are described in the embodiments, but limitation is not made an invention that requires all such features, and multiple such features may be combined as appropriate. Furthermore, in the attached drawings, the same reference numerals are given to the same or similar configurations, and redundant description thereof is omitted.

First Embodiment

The configuration and operations of an image sensor and an image capturing apparatus according to a first embodiment will be described hereinafter. FIG. 1 is a block diagram illustrating the configuration of an image capturing apparatus 100 according to the first embodiment.

The image capturing apparatus 100 includes a lens unit 101, a stacked image sensor 102, a sensor actuator 103, an image processing/recording LSI circuit 104, external memory 105, a recording medium 106, a display device 107, and a gyrosensor 108.

The image processing/recording LSI circuit 104 is constituted by a sensor IF unit 109, an image processing unit 110, a recording signal processing unit 111, an IS control unit 112, a defocus amount calculating unit 113, a lens control unit 114, an object recognizing unit 115, and a memory IF unit 116.

The lens unit 101 adjusts the focus, and also adjusts the focal length, F number, and the like, by driving a focus lens in response to a focus lens drive signal S114 from the lens control unit 114. The focus, focal length, F number, and so on are supplied as a lens state S110 from the lens unit 101 to the defocus amount calculating unit 113, where a defocus amount S113 is calculated.

The lens control unit 114 receives the defocus amount S113 and carries out automatic focus adjustment (autofocus; simply "AF" hereinafter). A feedback loop control mechanism is configured as a result.

The stacked image sensor 102 (an integrated circuit chip) takes an optical image formed after the focus, focal length, F number, and other adjustments carried out by the lens unit 101, and uses a pixel circuit including photoelectric conversion elements to carry out a process for converting the optical image into a digital signal, digital conversion, and digital signal processing. The stacked image sensor 102 outputs results of this processing to the sensor IF unit 109 of the image processing/recording LSI circuit 104 as first to fourth stacked sensor RAW output signals S100 to S103.

The sensor IF unit 109 functions as an input unit for the first to fourth stacked sensor RAW output signals S100 to S103, carrying out processing such as serial-parallel conversion, rearrangement into a Bayer pattern, and the like on the signals S100 to S103 and then supplying the result to the image processing unit 110 as a Bayer pattern RAW image S104.

The image processing unit 110 carries out known image processing on the Bayer pattern RAW image S104, such as synchronization processing, tone processing such as gamma conversion, and noise reduction processing, generates a YUV image for recording S105 and a YUV image for display S106, and supplies those images to the recording signal processing unit 111 and the display device 107, respectively. Through this, an image is captured and displayed for live view shooting ("LV" or "LV shooting" hereinafter, a moving image/a still image is recorded, and so on.

The recording signal processing unit 111 generates recording image data S108 in a predetermined recording format by compressing the moving image/still image, and records the data into the recording medium 106, which is a memory card or the like, as an image data file.

The stacked image sensor 102 generates object position and movement information S118, and supplies that information to the IS control unit 112. Referring also to gyrosensor output S117 from the gyrosensor 108, the IS control unit 112 carries out motion detection of the image sensor and of the image capturing apparatus 100 as a whole, generates a sensor position drive signal S119 taking into account both the detection result and motion of the object, and supplies that signal to the sensor actuator 103. As a result, when shooting a moving image or a still image, what is known as an image stabilization (IS) function is implemented by moving the stacked image sensor 102 to an appropriate position. A detecting unit such as an accelerometer may be provided in addition to the gyrosensor.

The stacked image sensor 102 has a pupil-division pixel structure capable of imaging plane phase difference-based rangefinding, and generates an image shift amount S111, which is supplied to the defocus amount calculating unit 113. The image shift amount S111 is an amount of positional shift between images from different optical paths, obtained from the pupil division, and is not information of the distance to an object.

As described above, the defocus amount calculating unit 113 generates the defocus amount S113, and the defocus amount S113 can be obtained by multiplying the image shift amount S111 by a conversion coefficient based on the lens state S110 ("distance conversion coefficient" hereinafter). Furthermore, the defocus amount S113 contains error caused by spherical aberration in the lens unit 101, and it is therefore necessary to carry out correction based on the lens state S110, an image height, and so on ("defocus correction" hereinafter).

Distance conversion coefficient and defocus correction data S112 is pre-loaded into the external memory 105 from ROM or the like (not shown). The defocus amount calculating unit 113 finds a defocus correction amount from the distance conversion coefficient and defocus correction data S112, obtained through the memory IF unit 116, and the lens state S110. The defocus amount calculating unit 113 furthermore finds the defocus amount by multiplying the image shift amount S111 by the distance conversion coefficient and defocus correction data S112. The defocus amount calculating unit 113 then corrects the defocus amount by the defocus correction amount to generate the defocus amount S113.

The image processing unit 110 furthermore generates a YUV image for evaluation S107 and stores that image in the external memory 105 via the memory IF unit 116. The object recognizing unit 115 functions as a generating unit that reads an input image for object recognition S115 (which may be the same as the YUV image for evaluation S107) and generates object recognition information S116 indicating the position of a specific object such as the face, head area, or the like of a person, a reliability of the object, and so on. The object recognizing unit 115 then supplies the generated object recognition information S116 to the stacked image sensor 102. The object recognition information S116 is used by the stacked image sensor 102 to specify a target object when generating the object position and movement information S118, the image shift amount S111, and so on.

Of the above-described configuration and operations of the image capturing apparatus 100, operation sequences will be described later. The configuration and operations of the stacked image sensor 102, which are the essence of the present embodiment, will be described next.

Figure 2:
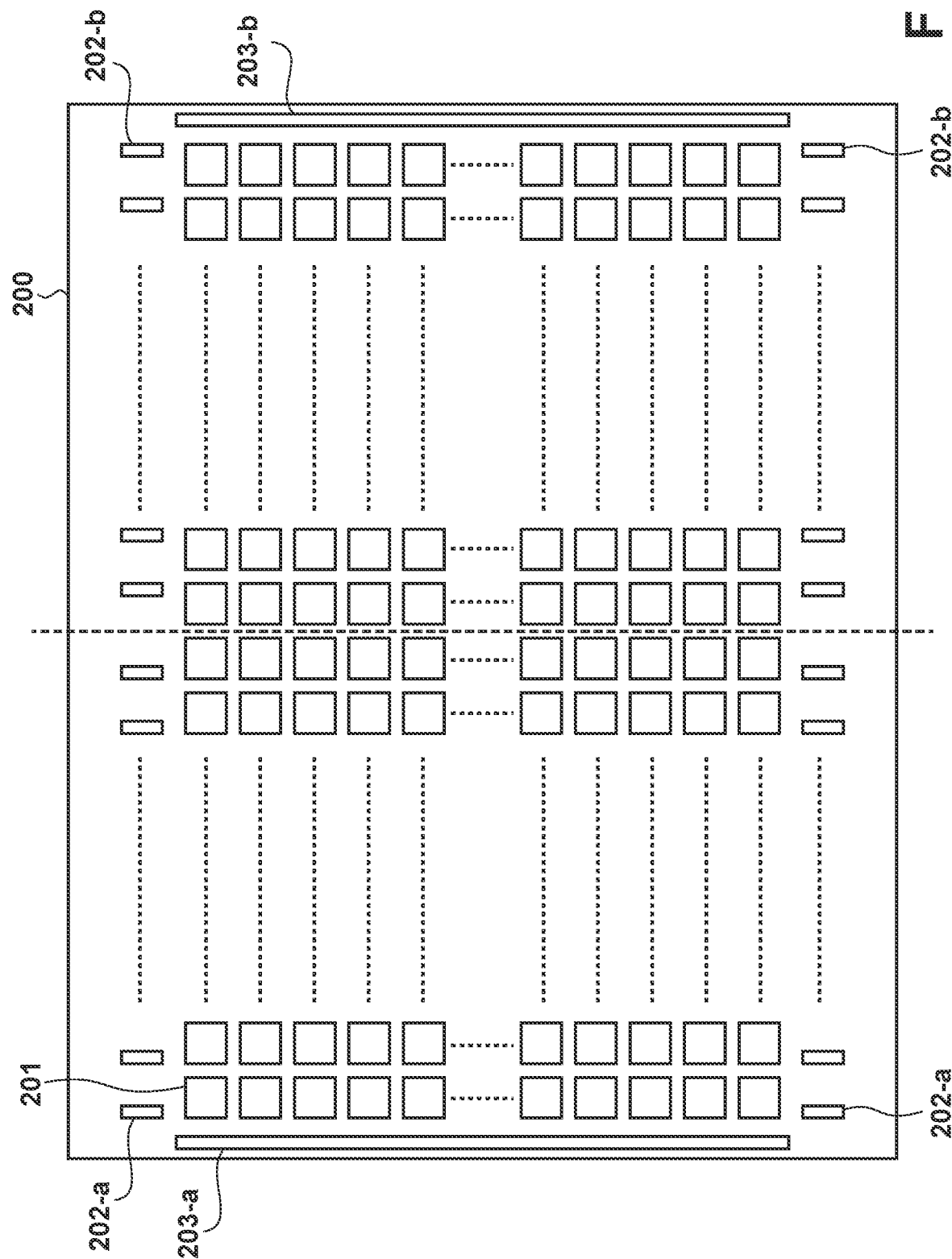
FIG. 2 is a plan view of a pixel chip in a stacked image sensor.
Figure 3:
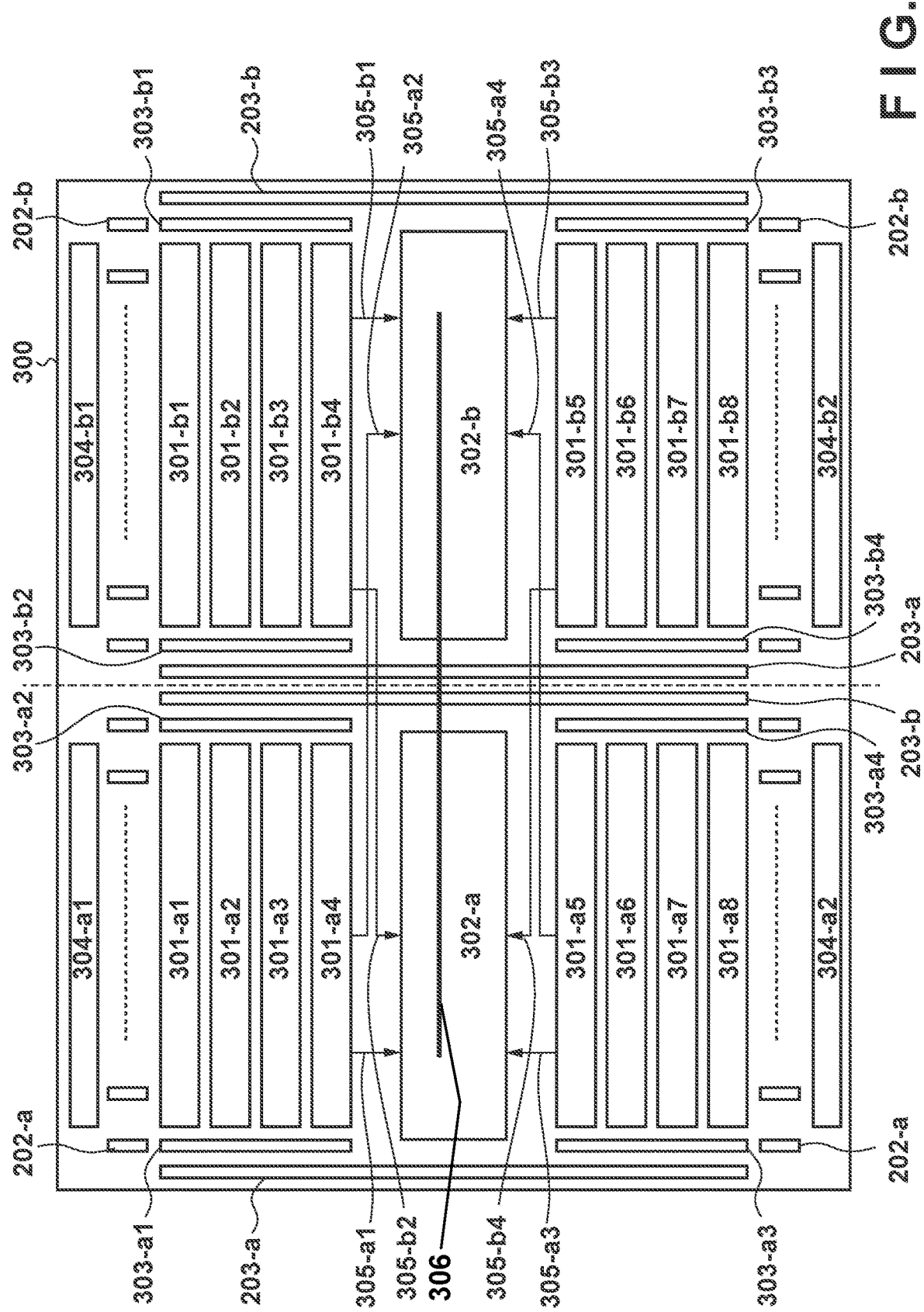
FIG. 3 is a plan view of a logic chip in a stacked image sensor.

FIG. 2 is a plan view of a substrate on which a pixel chip of the stacked image sensor 102 according to the present embodiment is provided, and FIG. 3 is a plan view of a substrate on which a logic chip of the stacked image sensor 102 is provided.

In FIG. 2, a pixel chip main body 200 is constituted by unit pixels 201 disposed in a matrix, pixel signal transmission TSV units 202 that transmit pixel output signals (captured image signals) to the logic chip (described later), and vertical drive signal transmission TSV units 203 that are supplied with vertical drive signals from the logic chip (described later).

The pixel signal transmission TSV units 202 and the vertical drive signal transmission TSV units 203 are, due to the chip layout of the logic chip (described later), divided into a left-side pixel signal transmission TSV unit 202-a and a right-side pixel signal transmission TSV unit 202-b, and a left-side vertical drive signal transmission TSV unit 203-a and a right-side vertical drive signal transmission TSV unit 203-b, respectively.

In FIG. 3, a logic chip main body 300 is constituted by column circuit units 301, digital signal processing circuits 302, repeater circuits 303, output interface circuits 304, ADC output data lines 305, and a CPU bus line 306.

A silicon layer and most of an interconnect layer of the logic chip main body 300 are manufactured in a semiconductor exposure device through stepping exposure, in which the left side and the right side are exposed separately over two different exposures. Thus a left-side digital signal processing circuit 302-a and a right-side digital signal processing circuit 302-b are formed using the same mask pattern, taking the broken line in the center of the diagram as a boundary.

Likewise, the column circuit units 301 are disposed above and below the digital signal processing circuits 302. Because the left-side pixel signal transmission TSV unit 202-a and the right-side pixel signal transmission TSV unit 202-b are disposed with left-right symmetry at the top side and the bottom side of the pixel chip main body 200 and the logic chip main body 300, the column circuit units 301 are disposed in a fixed manner as first to fourth column circuit units 301-a1 to 301-a4 on the left side, fifth to eighth column circuit units 301-a5 to 301-a8 on the left side, first to fourth column circuit units 301-b1 to 301-b4 on the right side, and fifth to eighth column circuit units 301-b5 to 301-b8 on the right side.

Additionally, the repeater circuits 303 provide a logic signal transmission repeater function between the digital signal processing circuits 302 and the output interface circuits 304, and are formed as first to fourth repeater circuits 303-a1 to 303-a4 on the left side and first to fourth repeater circuits 303-b1 to 303-b4 on the right side.

Furthermore, the output interface circuits 304 are formed as a first output interface circuit 304-a1 on the left side, a second output interface circuit 304-a2 on the left side, a first output interface circuit 304-b1 on the right side, and a second output interface circuit 304-b2 on the right side. Image outputs from the digital signal processing circuits 302, which are input through the repeater circuits 303, are output as the first to fourth stacked sensor RAW output signals S100 to S103, respectively, as clock-embedded high-speed serial signals, for example.

The pixel signal transmission TSV units 202 are disposed so as to be positioned in the same plane with respect to the stacking direction of the pixel chip main body 200 and the logic chip main body 300, and supply four lines of pixel signals to the column circuit units 301 from the pixel chip main body 200 at the same time. The four lines of the pixel signals are AD-converted at the same time by the column circuit units 301, with the results supplied to the digital signal processing circuits 302 and subjected to signal processing (described later).

The digital signal processing circuits 302 generate pixel control signals used in vertical driving of the pixel chip main body 200, and those signals are supplied to the pixel chip main body 200 from the left-side vertical drive signal transmission TSV unit 203-a and the right-side vertical drive signal transmission TSV unit 203-b. Note that the left-side vertical drive signal transmission TSV unit 203-a and the right-side vertical drive signal transmission TSV unit 203-b laid out as indicated in FIG. 3 are unused parts which are not connected to the pixel chip main body 200.

Part of the interconnect layer of the logic chip main body 300 is exposed through a single exposure ("one-shot exposure" hereinafter) by lowering the resolution of the exposure in the semiconductor exposure device.

The ADC output data lines 305 and the CPU bus line 306 are formed through one-shot exposure. In the present embodiment, the left-side digital signal processing circuit 302-a includes a CPU, and realizes an image capturing function and an imaging plane phase difference-based AF preprocessing function. Note that the right-side digital signal processing circuit 302-b also includes a CPU, and realizes an image capturing function and an object tracking processing function. It is therefore necessary for pixel signals which have been transmitted separately to the left and right from the pixel chip main body 200 to be supplied to the left-side digital signal processing circuit 302-*a* and the right-side digital signal processing circuit 302-*b* as a single image signal combining the left and right sides, after the signals have been digitized by the column circuit units 301. As such, the ADC output data lines 305 are configured to pass signals mutually to the left and right, respectively, using left-side first to fourth ADC output data lines 305-*a*1 to 305-*a*4 and right-side first to fourth ADC output data lines 305-*b*1 to 305-*b*4.

As described earlier, the generation of the image shift amount S111 and the object position and movement information S118 by the stacked image sensor 102 is carried out by the CPU of the left-side digital signal processing circuit 302-*a* and the CPU of the right-side digital signal processing circuit 302-*b*, but higher performance can be achieved by those CPUs referring to the respective pieces of information as the image shift amount S111 and the object position and movement information S118 are being generated. This mutual reference is implemented using the CPU bus line 306.

Figure 4A:
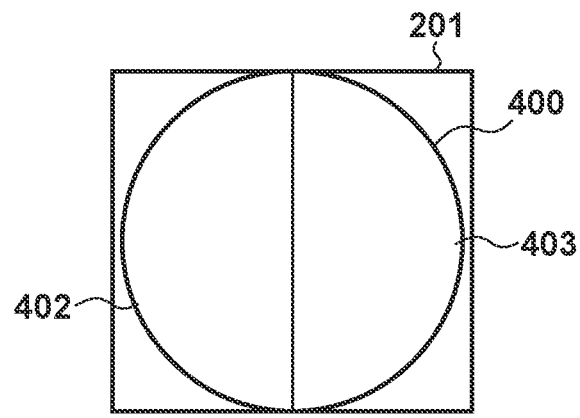
FIG. 4A is a plan view of a unit pixel.
Figure 4B:
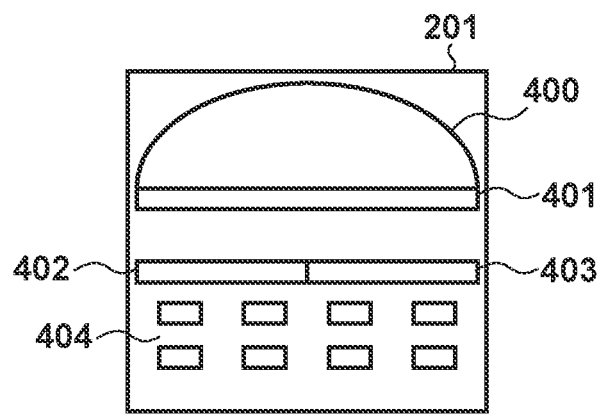
FIG. 4B is a cross-sectional view of a unit pixel.

FIG. 4A is a plan view of the unit pixel 201 illustrated in FIG. 2, and FIG. 4B is a cross-sectional view of the unit pixel 201 illustrated in FIG. 2. A unit pixel unit 201 is constituted by a microlens 400, a color filter 401, a first photoelectric conversion unit 402, a second photoelectric conversion unit 403, and a pixel chip interconnect layer 404.

The microlens 400, which constitutes part of a microlens array, focuses incident light and guides that light to the first photoelectric conversion unit 402 and the second photoelectric conversion unit 403. The color filter 401 transmits incident light of a specific wavelength component. The color filter 401 has spectral sensitivity properties which transmit light of a wavelength corresponding to one of red (R), green (G), and blue (B). Whether the filter of the unit pixel unit 201 has red (R), green (G), or blue (B) wavelength transmission properties depends on the position of that unit pixel unit 201 in the Bayer pattern.

The first photoelectric conversion unit 402 and the second photoelectric conversion unit 403 generate electrical signals through photoelectric conversion. The first photoelectric conversion unit 402 receives a light beam that has passed through a first pupil region of an exit pupil of an optical imaging system 101 (i.e., a pupil-divided image). The second photoelectric conversion unit 403 receives a light beam that has passed through a second pupil region different from the first pupil region (i.e., a pupil-divided image). There is disparity between an image signal obtained based on the amount of charge accumulated in the group of photoelectric conversion units 402 of the pixel chip main body 200 and an image signal obtained based on the amount of charge accumulated in the group of photoelectric conversion units 403 of the pixel chip main body 200. In focus detection, a focus shift amount is detected by detecting shift between the projection positions of images having such disparity. Meanwhile, the signal of a captured image can be obtained by adding the signals obtained by the photoelectric conversion units 402 with the signals obtained by the photoelectric conversion units 403.

In the following, a pupil-divided image signal which can be obtained by the first photoelectric conversion unit 402 will be called an "A image signal", and a pupil-divided image signal which can be obtained by the second photoelectric conversion unit 403 will be called a "B image signal". A signal which can be obtained by adding the A image signal and the B image signal will be called an A+B image signal.

Figure 5:
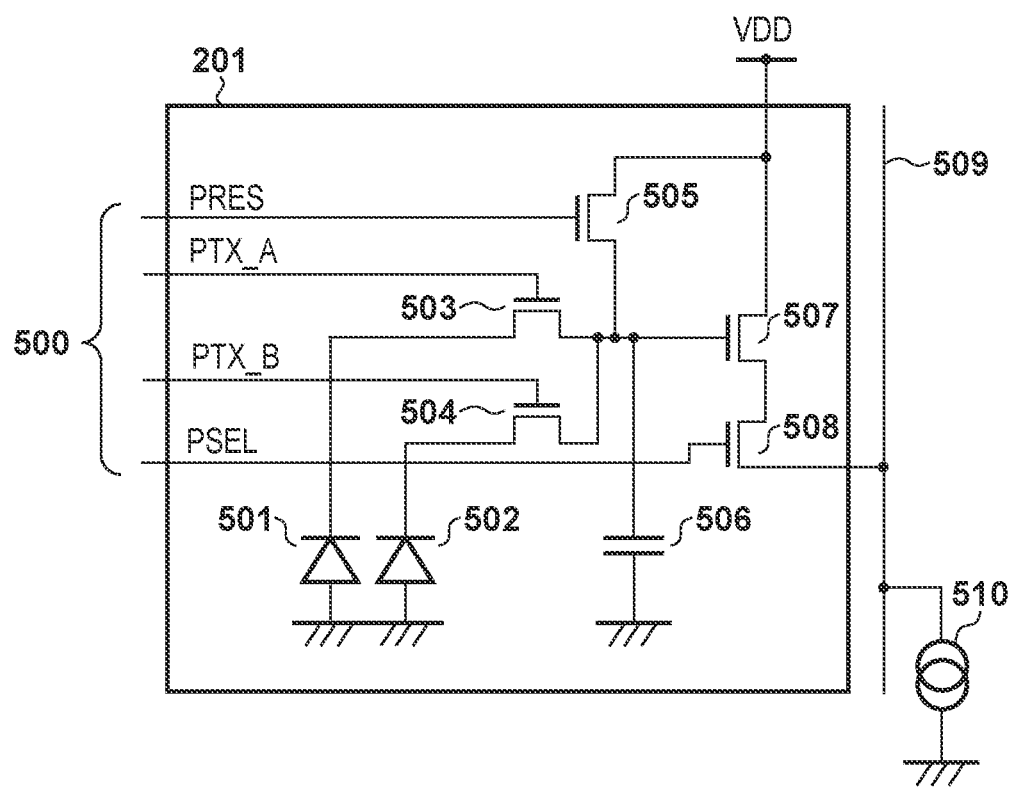
FIG. 5 is a diagram illustrating an example of the circuit configuration of a unit pixel.

FIG. 5 is an example of the circuit configuration of the unit pixel 201 illustrated in FIG. 2. In the unit pixel 201, a first photodiode ("first PD" hereinafter) 501 (corresponding to the first photoelectric conversion unit 402) and a second photodiode ("second PD" hereinafter) 502 (corresponding to the second photoelectric conversion unit 403) generate charges upon receiving object light, and accumulate the generated charges.

The charges accumulated by the first PD 501 and the second PD 502 are transferred to a floating diffusion unit ("FD" hereinafter) 506 via a first transfer MOS transistor ("first transfer switch" hereinafter) 503 and a second transfer MOS transistor ("second transfer switch" hereinafter) 504, respectively. When a selection switch 508 is turned on, the charges transferred to the FD 506 are output to a column output line 509 as voltages corresponding to the charges, via an amplifying MOS transistor that forms a source-follower amp ("SF" hereinafter) 507.

Note that the selection switch 508 is controlled in units of lines, and thus all pixel signals in the selected line are output at once to the column output lines 509 in the columns. A reset MOS transistor ("reset switch" hereinafter) 505 resets the potential of the FD 506, and resets the potentials of the first PD 501 and the second PD 502 via the first transfer switch 503 and the second transfer switch 504, to VDD.

The first transfer switch 503, the second transfer switch 504, the reset switch 505, and the selection switch 508 are controlled by control signals PTX_A, PTX_B, PRES, and PSEL, respectively, which are supplied from the left-side vertical drive signal transmission TSV unit 203-*a* and the right-side vertical drive signal transmission TSV unit 203-*b* via a pixel control signal input 500. Note that a current source 510 is connected to each column output line 509.

Figure 6:
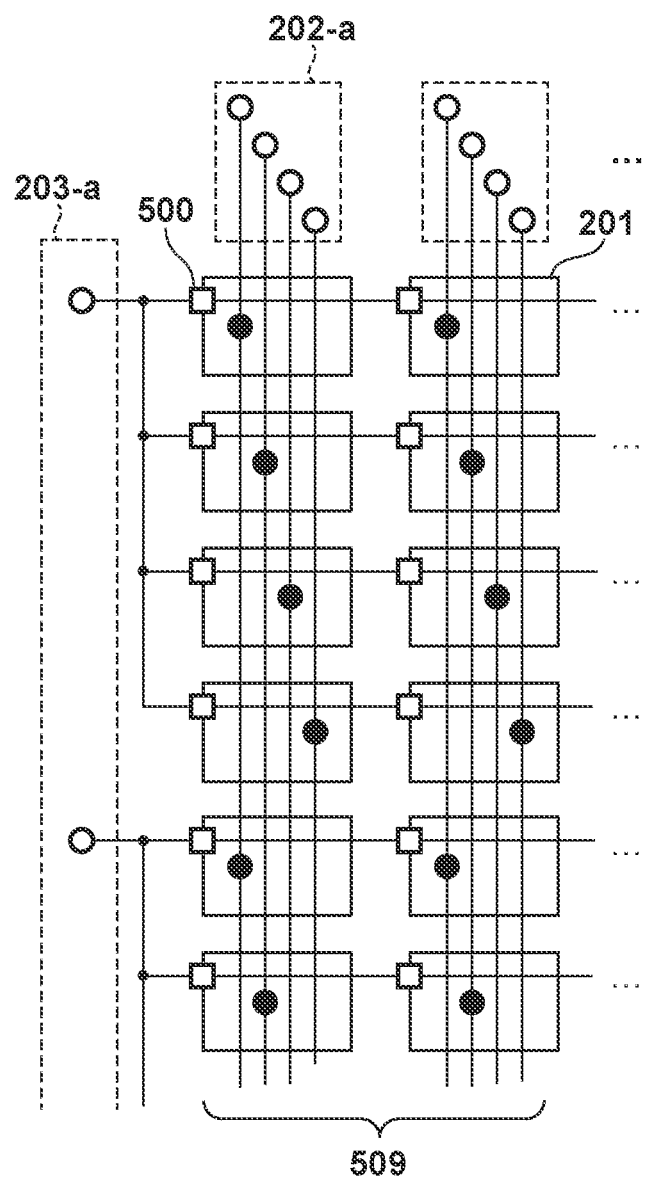
FIG. 6 is a diagram illustrating, in detail, the configuration of a unit pixel, a pixel signal transmission TSV unit, and a vertical drive signal transmission TSV unit.

FIG. 6 illustrates, in detail, the connection configuration of the unit pixels 201, the pixel signal transmission TSV units 202, and the vertical drive signal transmission TSV units 203 illustrated in FIG. 2. FIG. 6 illustrates interconnects in a region corresponding to a total of 12 unit pixels, i.e., six in the vertical direction and two in the horizontal direction.

Four column output lines 509 are provided for each column of unit pixels 201, and each unit pixel 201 is connected to a different one of the four column output lines 509 every four lines. Output signals of the unit pixels 201 can be read out simultaneously for four lines by inputting the pixel control signal input 500 (PTX_A, PTX_B, PRES, and PSEL) in common every four lines. The pixel signal transmission TSV units 202 (the left-side pixel signal transmission TSV unit 202-*a*, in FIG. 6) make it possible to transfer, to the logic chip main body 300, the four column output lines 509 provided for each column of unit pixels 201.

Figure 7:
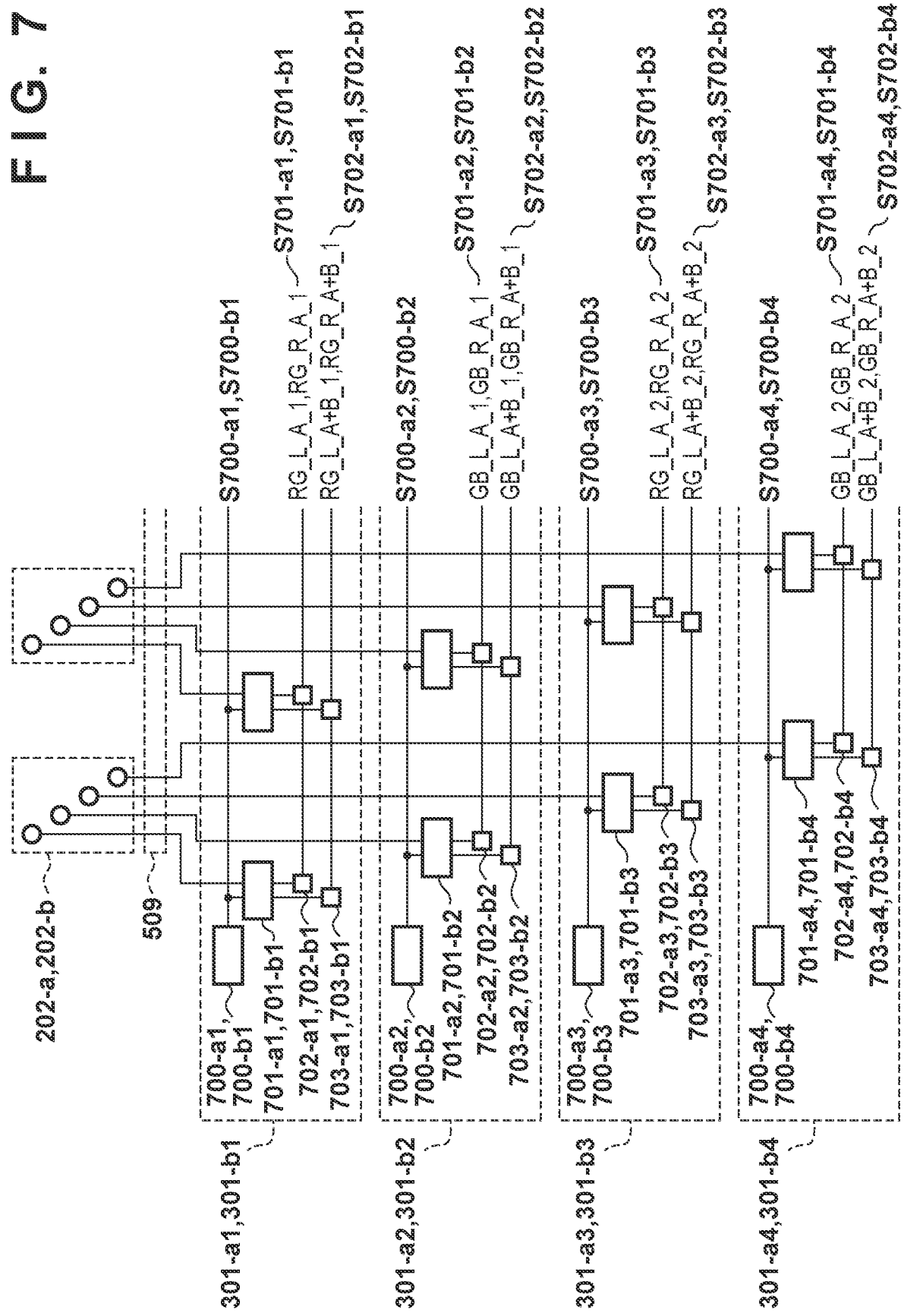
FIG. 7 is a diagram illustrating, in detail, the configuration of a column circuit unit and the pixel signal transmission TSV unit.

FIG. 7 illustrates, in detail, the configuration of the column circuit units 301 illustrated in FIG. 3 and the pixel signal transmission TSV units 202. The four column output lines 509 provided for each column of unit pixels 201, which are input from the pixel signal transmission TSV units 202, are connected to respective ones of the column circuits and column ADCs 701-*a*1 to 701-*a*4 of the first to fourth column output lines on the left side (the column circuits and column ADCs 701-*b*1 to 701-*b*4 of the first to fourth column output lines on the right side) of the column circuits and column ADCs 701. Additionally, the column circuits and the column ADCs 701 are controlled by a column circuit control unit 700, and the four lines of pixel signals obtained from the column output lines 509 can be AD-converted simultaneously.

Although detailed descriptions will be given later, the column circuits and the column ADCs 701 hold digital data of the A image signal and the A+B image signal, respectively. Four lines' worth of the A image signal and the A+B image signal are subjected to horizontal progressive scanning and output simultaneously by an A image data column selection circuit 702 and an A+B image data column selection circuit 703, respectively.

Figure 8:
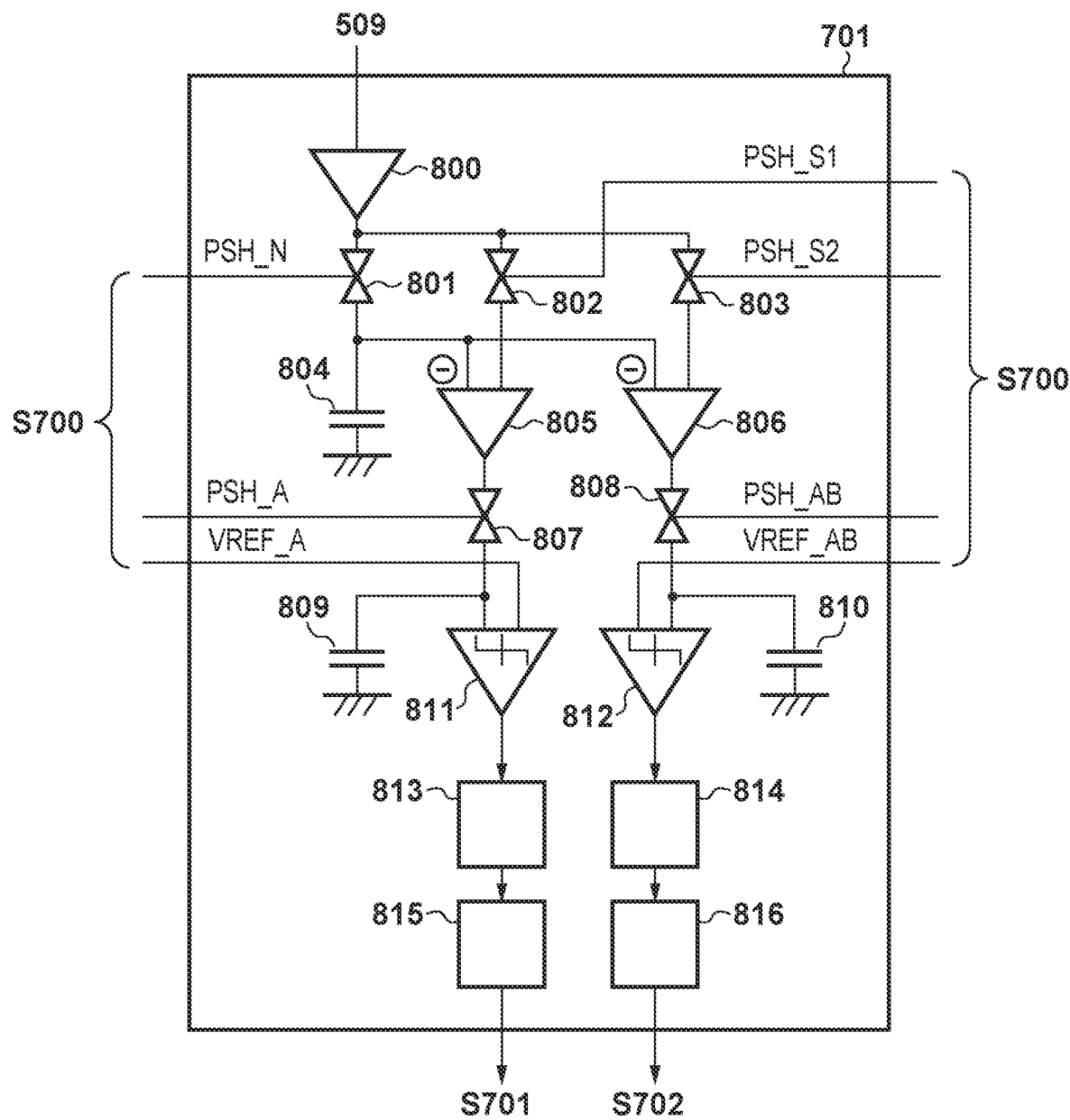
FIG. 8 is a diagram illustrating, in detail, the configuration of a column circuit and a column ADC.

FIG. 8 is a diagram illustrating, in detail, the configuration of the column circuit and the column ADC 701 illustrated in FIG. 7. An amp 800 amplifies a signal appearing on the column output line 509. The signal is then selected and input to a capacitor holding an N signal ("N capacitor" hereinafter) 804, a first differential amp 805, or a second differential amp 806 by a first switch turned on/off by PSH_N ("first switch" hereinafter) 801, a second switch turned on/off by PSH_S1 ("second switch" hereinafter) 802, or a third switch turned on/off by PSH_S2 ("third switch" hereinafter) 803.

The outputs of the first differential amp 805 and the second differential amp 806 are held in a capacitor which holds an A−N signal ("A−N capacitor" hereinafter) 809 and a capacitor which holds an A+B−N signal ("A+B−N capacitor" hereinafter) 810 by a fourth switch turned on/off by PSH_A ("fourth switch" hereinafter) 807 and a fifth switch turned on/off by PSH_AB ("fifth switch" hereinafter) 808.

Voltages held in the A−N capacitor 809 and the A+B−N capacitor 810 are compared with a reference voltage VREF_A and a reference voltage VREF_AB by a first comparator 811 and a second comparator 812, respectively.

The first comparator 811 and the second comparator 812 compare the voltages held in the A−N capacitor 809 and the A+B−N capacitor 810 with the reference voltage VREF_A and the reference voltage VREF_AB, respectively, and output a binary value indicating either low level or high level in accordance with the magnitude relationships between the voltages.

A clock ("CLK" hereinafter) activates at the same time as the start of a transition of a reference voltage which is changed in a sawtooth shape. A first counter 813 and a second counter 814 increment counts in correspondence with the CLK when the outputs of the respective comparators are high level, and stop the counts when the outputs of the respective comparators invert to low level (when the magnitude relationships invert).

When the count has been stopped, the value in the first counter 813 is held in first memory ("A image memory" hereinafter) 815, and the value in the second counter 814 is held in second memory ("A+B image memory" hereinafter) 816.

PSH_N, PSH_S1, PSH_S2, PSH_A, PSH_AB, the reference voltage VREF_A, and the reference voltage VREF_AB are generated in the column circuit control unit 700, and are collectively indicated as a column circuit control signal S700.

Figure 9:
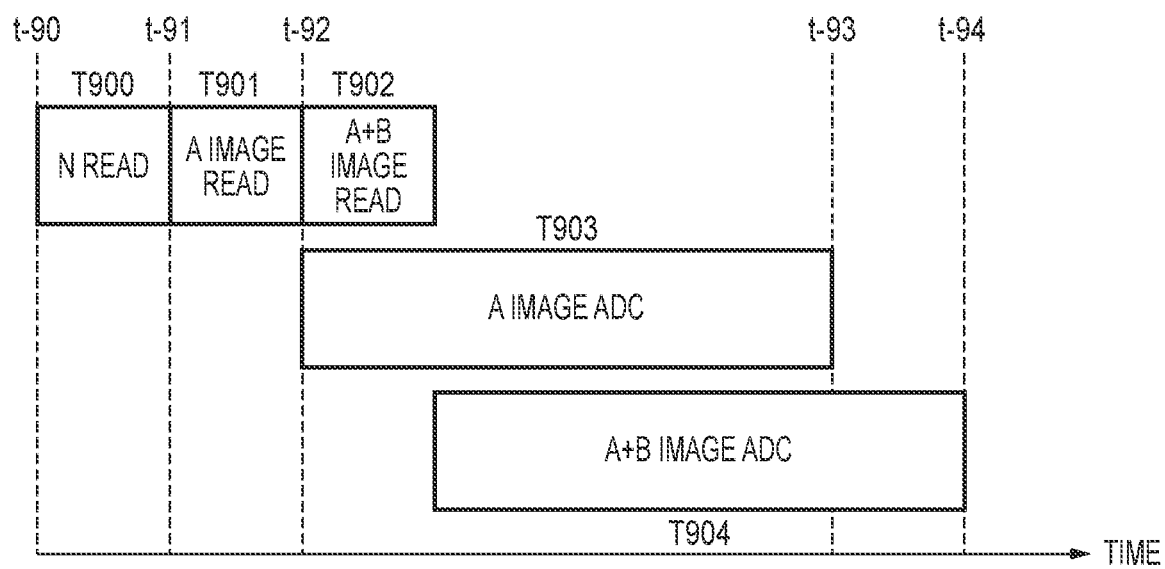
FIG. 9 is an operation timing chart from the unit pixel to the column ADC.

FIG. 9 is an operation timing chart from the unit pixel 201 to the column ADC. The operations of the elements illustrated in FIGS. 5 to 8 will be described hereinafter with reference to FIG. 9.

An N read period T900 is a period in which a reset noise signal is held in the N capacitor 804 via the SF 507, the selection switch 508, the column output line 509, the amp 800, and the first switch 801, the reset noise signal being a signal arising when, as described earlier, the reset switch 505 resets the potential of the FD 506, and the potential of the first PD 501 and the second PD 502 via the first transfer switch 503 and the second transfer switch 504, respectively, to VDD.

An A image read period T901 is a period in which the charge in the first PD 501 is read out to the FD 506 (an A image charge), is input to the first differential amp 805 via the SF 507, the selection switch 508, the column output line 509, the amp 800, and the second switch 802, has the reset noise signal held in the N capacitor 804 subtracted therefrom, and is then held in the A−N capacitor 809 via the fourth switch 807.

An A+B image read period T902 is a period in which the charge in the second PD 502 is added to the charge of the first PD 501 held in the FD 506 (an A+B image charge), is input to the second differential amp 806 via the SF 507, the selection switch 508, the column output line 509, the amp 800, and the third switch 803, has the reset noise signal held in the N capacitor 804 subtracted therefrom, and is then held in the A+B−N capacitor 810 via the fifth switch 808.

The A−N capacitor 809 and the A+B−N capacitor 810 thus end up holding the A image signal and the A+B image signal, respectively, from which the reset noise signal has been removed.

An A image ADC period T903 is a period in which the first counter 813 is incremented while comparing the voltage of the A image signal held in the A−N capacitor 809 with the reference voltage VREF_A, and the count value of the first counter 813 is stored in the A image memory 815. An A image data line output S701 can be referenced once the A image ADC period T903 is complete.

An A+B image ADC period T904 is a period in which the second counter 814 is incremented while comparing the voltage of the A+B image signal held in the A+B−N capacitor 810 with the reference voltage VREF_AB, and the count value of the second counter 814 is stored in the A+B image memory 815. An A+B image data line output S702 can be referenced once the A+B image ADC period T904 is complete.

In terms of the A image data line output S701 and the A+B image data line output S702 of FIG. 7, a detailed overview of the signal outputs from the column circuit units 301 illustrated in FIG. 3 can be given as follows.

Because the logic chip main body 300 is manufactured through stepping exposure by a semiconductor exposure device, and because the column circuits and column ADCs 701 AD-convert four lines' worth of the pixel signals obtained from the column output lines 509 simultaneously, the A image data line output S701 is constituted by eight outputs, namely: a left-side first A image data line output S701-*a*1 (RG first line); a left-side second A image data line output S701-*a*2 (GB second line); a left-side third A image data line output S701-*a*3 (RG third line); a left-side fourth A image data line output S701-*a*4 (GB fourth line); a right-side first A image data line output S701-*b*1 (RG first line); a right-side second A image data line output S701-*b*2 (GB second line); a right-side third A image data line output S701-*b*3 (RG third line); and a right-side fourth A image data line output S701-*b*4 (GB fourth line).

Meanwhile, the A+B image data line output S702 is constituted by eight outputs, namely: a left-side first A+B image data line output S702-*a*1 (RG first line); a left-side second A+B image data line output S702-*a*2 (GB second line); a left-side third A+B image data line output S702-*a*3 (RG third line); a left-side fourth A+B image data line output S702-*a*4 (GB fourth line); a right-side first A+B image data line output S702-*b*1 (RG first line); a right-side second A+B image data line output S702-*b*2 (GB second line); a right-side third A+B image data line output S702-*b*3 (RG third line); and a right-side fourth A+B image data line output S702-*b*4 (GB fourth line).

Figure 10:
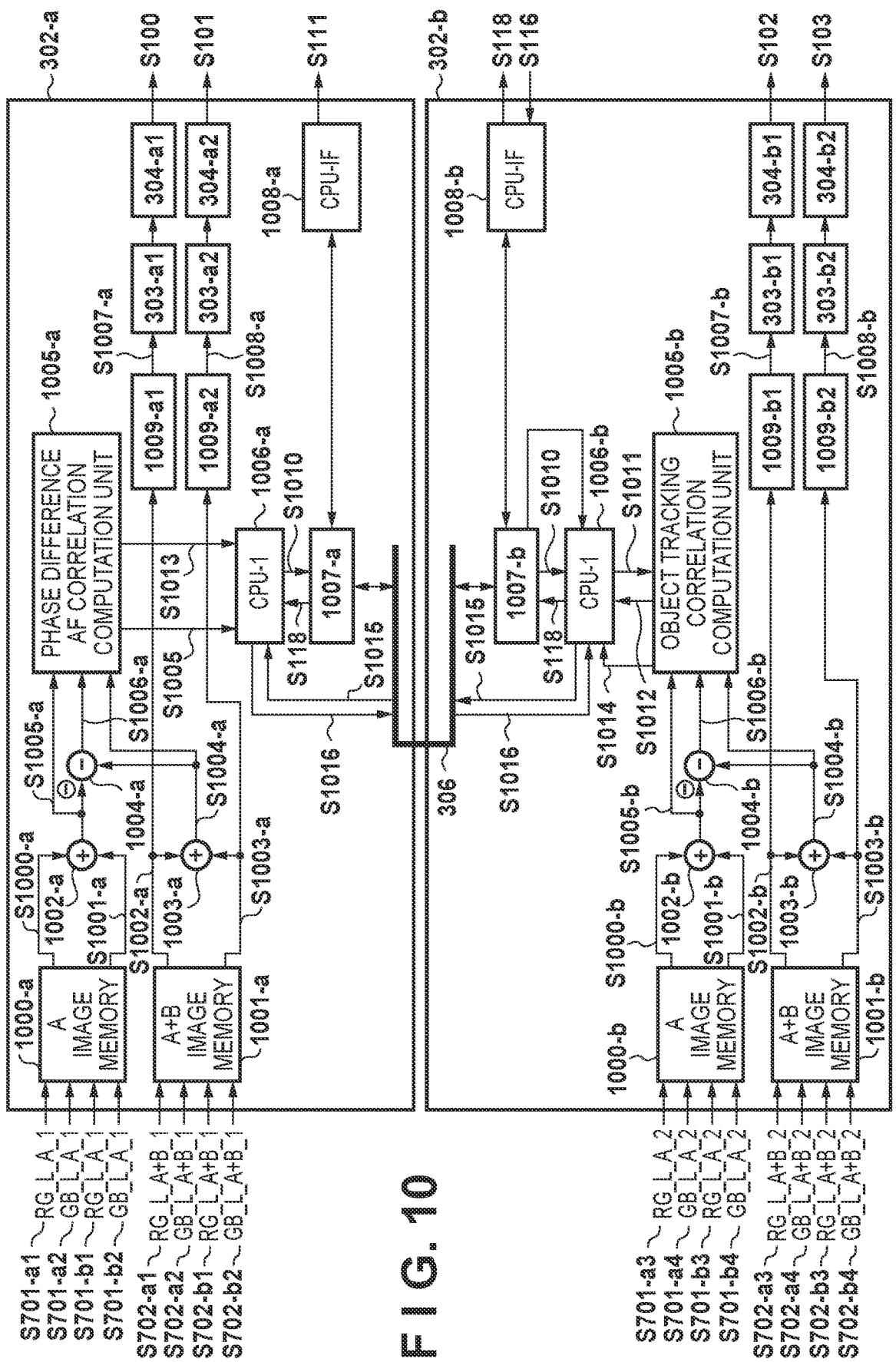
FIG. 10 is a diagram illustrating, in detail, a left-side digital signal processing circuit and a right-side digital signal processing circuit.

FIG. 10 is a diagram illustrating, in detail, the left-side digital signal processing circuit 302-*a* and the right-side digital signal processing circuit 302-*b* illustrated in FIG. 3. The digital signal processing circuits 302 will be described in detail hereinafter.

In FIG. 10, SRAM ("A image memory" hereinafter) 1000, which holds two lines' worth of the A image data, holds the A image data line output S701, and is constituted by SRAM 1000-*a* which holds two lines' worth of the left-side A image data ("left-side A image memory" hereinafter) and SRAM 1000-*b* which holds two lines' worth of the right-side A image data ("right-side A image memory" hereinafter).

Likewise, SRAM ("A+B image memory" hereinafter) 1001, which holds two lines' worth of the A+B image data, holds the A+B image data line output S702, and is constituted by SRAM 1001-*a* which holds two lines' worth of the left-side A+B image data ("left-side A+B image memory" hereinafter) and SRAM 1001-*b* which holds two lines' worth of the right-side A+B image data ("right-side A+B image memory" hereinafter).

The inputs to the left-side A image memory 1000-*a* are the left-side first A image data line output S701-*a*1 (RG first line), the left-side second A image data line output S701-*a*2 (GB second line), the right-side first A image data line output S701-*b*1 (RG first line), and the right-side second A image data line output S701-*b*2 (GB second line).

Likewise, the inputs to the right-side A image memory 1000-*b* are the left-side third A image data line output S701-*a*3 (RG third line), the left-side fourth A image data line output S701-*a*4 (GB fourth line), the right-side third A image data line output S701-*b*3 (RG third line), and the right-side fourth A image data line output S701-*b*4 (GB fourth line).

Furthermore, the inputs to the left-side A+B image memory 1001-*a* are the left-side first A+B image data line output S702-*a*1 (RG first line), the left-side second A+B image data line output S702-*a*2 (GB second line), the right-side first A+B image data line output S702-*b*1 (RG first line), and the right-side second A+B image data line output S702-*b*2 (GB second line).

Further still, the inputs to the right-side A+B image memory 1001-*b* are the left-side third A+B image data line output S702-*a*3 (RG third line), the left-side fourth A+B image data line output S702-*a*4 (GB fourth line), the right-side third A+B image data line output S702-*b*3 (RG third line), and the right-side fourth A+B image data line output S702-*b*4 (GB fourth line).

In this manner, the RG first lines and the GB second lines are collected in the A image memory 1000, while the RG third lines and the GB fourth lines are collected in the A+B image memory 1001, so that the left-side digital signal processing circuit 302-*a* and the right-side digital signal processing circuit 302-*b* each handle alternating combinations of the RG and GB lines.

As described above, in the present embodiment, the left-side digital signal processing circuit 302-*a* realizes an image capturing function and an imaging plane phase difference-based AF preprocessing function.

The output of the left-side A image memory 1000-*a* is a first line of A image data for AF ("A image RG line for AF" hereinafter) S1000-*a* and a second line of A image data for AF ("A image GB line for AF" hereinafter) S1001-*a*. The A image RG line for AF S1000-*a* and the A image GB line for AF S1001-*a* are added in an adding circuit 1002-*a* which adds two lines' worth of the left-side A image data ("left-side A image line adding circuit" hereinafter), and A image line data for AF ("A image for AF" hereinafter) S1005-*a* is generated as a result.

Additionally, the output of the left-side A+B image memory 1001-*a* is a first line of A+B image data for AF ("A+B image RG line for AF" hereinafter) S1002-*a* and a second line of A+B image data for AF ("A+B image GB line for AF" hereinafter) S1003-*a*. The A+B image RG line for AF S1002-*a* and the A+B image GB line for AF S1003-*a* are added in an adding circuit 1003-*a* which adds two lines' worth of the left-side A+B image data ("left-side A+B image line adding circuit" hereinafter), and A+B image line data for AF ("A+B image for AF" hereinafter) S1004-*a* is generated as a result.

Furthermore, a subtracting circuit which generates a left-side line-added B image ("left-side B image generation subtracting circuit" hereinafter) 1004-*a* generates B image line data for AF ("B image for AF" hereinafter) S1006-*a* by subtracting the A image for AF S1005-*a* from the A+B image for AF S1004-*a*.

A left-side first correction circuit 1009-*a*1 and a left-side second correction circuit 1009-*a*2 carry out what is known as "sensor correction", such as shading correction and missing pixel correction, on the A+B image RG line for AF S1002-*a* and the A+B image GB line for AF S1003-*a*, respectively. Corrected A+B image first line data for display/recording ("A+B image RG first line for display/recording" hereinafter) S1007-*a* and corrected A+B image second line data for display/recording ("A+B image GB second line for display/recording" hereinafter) S1008-*a* are generated as a result.

The A+B image RG first line for display/recording S1007-*a* and the A+B image GB second line for display/recording S1008-*a* are output from the left-side first output interface circuit 304-*a*1 and the left-side second output interface circuit 304-*a*2 as a first stacked sensor RAW output signal S100 and a second stacked sensor RAW output signal S101 after passing through the left-side first repeater circuit 303-*a*1 and the left-side second repeater circuit 303-*a*2, respectively.

A phase difference AF correlation computation unit 1005-*a* carries out a correlation computation using the A image for AF S1005-*a* and the B image for AF S1006-*a*, and generates image shift map data ("image shift map" hereinafter) S1009 obtained from the phase difference AF correlation computation and an image shift SAD computation completion interrupt S1013.

Note that although the A+B image for AF S1004-*a* is generated, that image is not used in the present embodiment.

Next, in the present embodiment, the right-side digital signal processing circuit 302-*b* realizes an image capturing function and an object tracking processing function, as described above.

The output of the right-side A image memory 1000-*b* is a first line of A image data for object tracking ("A image RG line for tracking" hereinafter) S1000-*b* and a second line of A image data for object tracking ("A image GB line for tracking" hereinafter) S1001-*b*. The A image RG line for tracking S1000-*b* and the A image GB line for tracking S1001-*b* are added in an adding circuit 1002-*b* which adds two lines' worth of the right-side A image data ("right-side A image line adding circuit" hereinafter), and A image line data for object tracking ("A image for tracking" hereinafter) S1005-*b* is generated as a result.

The output of the right-side A+B image memory 1001-*b* is a first line of A+B image data for object tracking ("A+B image RG line for tracking" hereinafter) S1002-*b* and a second line of A+B image data for object tracking ("A+B image GB line for tracking" hereinafter) S1003-*b*. The A+B image RG line for tracking S1002-*b* and the A+B image GB line for tracking S1003-*b* are added in an adding circuit 1003-*b* which adds two lines' worth of the right-side A+B image data ("right-side A+B image line adding circuit" hereinafter), and A+B image line data for object tracking ("A+B image for tracking" hereinafter) S1004-*b* is generated as a result.

Furthermore, a subtracting circuit which generates a right-side line-added B image ("right-side B image generation subtracting circuit" hereinafter) 1004-*b* generates B image line data for object tracking ("B image for tracking" hereinafter) S1006-*b* by subtracting the A image for tracking S1005-*b* from the A+B image for tracking S1004-*b*.

A right-side first correction circuit 1009-*b*1 and a right-side second correction circuit 1009-*b*2 carry out the same sensor correction as the left-side first correction circuit 1009-*a*1 and the left-side second correction circuit 1009-*a*2 on the A+B image RG line for tracking S1002-*b* and the A+B image GB line for tracking S1003-*b*, respectively. Corrected A+B image third line data for display/recording ("A+B image RG third line for display/recording" hereinafter) S1007-*b* and corrected A+B image fourth line data for display/recording ("A+B image GB fourth line for display/recording" hereinafter) S1008-*b* are generated as a result.

The A+B image RG third line for display/recording S1007-*b* and the A+B image GB fourth line for display/recording S1008-*b* are output from the right-side first output interface circuit 304-*b*1 and the right-side second output interface circuit 304-*b*2 as a third stacked sensor RAW output signal S102 and a fourth stacked sensor RAW output signal S103 after passing through the right-side first repeater circuit 303-*b*1 and the right-side second repeater circuit 303-*b*2, respectively.

An object tracking correlation computation unit 1005-*b* carries out a correlation computation using the A+B image for tracking S1004-*b* and a template image (described later), and generates a motion shift amount S1012 obtained from the object tracking correlation computation and a tracking SAD computation completion interrupt S1014.

Note that the phase difference AF correlation computation unit 1005-*a* and the object tracking correlation computation unit 1005-*b* both mainly involve correlation computation processing, and can therefore easily be realized by a single circuit formed through stepping exposure. Additionally, although the A image for tracking S1005-*b* and the B image for tracking S1006-*b* are generated, these images are not used in the present embodiment.

A left-side CPU 1006-*a* and a right-side CPU 1006-*b* have the same circuit configuration. Likewise, a left-side CPU bus arbitration circuit 1007-*a* and a right-side CPU bus arbitration circuit 1007-*b* have the same circuit configuration. Furthermore, a left-side CPU external interface circuit 1008-*a* and a right-side CPU external interface circuit 1008-*b* have the same circuit configuration.

Although details will be given later, the left-side CPU 1006-*a* finds an AF frame position and image shift amount S1010 on the basis of the image shift map S1009 and the object position and movement information S118, and outputs the image shift amount S111 via the left-side CPU bus arbitration circuit 1007-*a* and the left-side CPU external interface circuit 1008-*a*. The right-side CPU 1006-*b* finds the object position and movement information S118 from the motion shift amount S1012 and the AF frame position and image shift amount S1010, and outputs the object position and movement information S118 via the right-side CPU bus arbitration circuit 1007-*b* and the right-side CPU external interface circuit 1008-*b*.

Furthermore, the left-side CPU 1006-*a* sends the AF frame position and image shift amount S1010 to the right-side CPU 1006-*b* through the CPU bus line 306, which is constituted by interconnects formed through one-shot exposure with the left-side CPU bus arbitration circuit 1007-*a*. The right-side CPU 1006-*b* sends the object position and movement information S118 to the left-side CPU 1006-*a* through the CPU bus line 306, which is constituted by interconnects formed through one-shot exposure with the right-side CPU bus arbitration circuit 1007-*b*.

In this manner, the CPU bus line 306, the left-side CPU 1006-*a*, and the right-side CPU 1006-*b*, which are constituted by interconnects formed through one-shot exposure, link the imaging plane phase difference-based AF preprocessing function handled by the left-side digital signal processing circuit 302-*a* and the object tracking processing function handled by the right-side digital signal processing circuit 302-*b* to each other, which has an effect of improving the functions and performance.

The image shift SAD computation completion interrupt S1013, the tracking SAD computation completion interrupt S1014, an object position specification completion interrupt S1015, and an AF position determination completion interrupt S1016 will be described later when describing a processing flowchart of the left-side CPU 1006-*a* and a processing flowchart of the right-side CPU 1006-*b*.

FIG. 11 is a processing timing chart of the left-side digital signal processing circuit 302-*a* (corresponding to four horizontal processes).

After a timing t-1100, which is the start of processing of first to fourth lines of the sensor RAW data, the sequence moves to the N read period T900, the A image read period T901, and the A+B image read period T902, as described with reference to FIG. 9. Additionally, once the A image read period T901 is complete, the sequence moves to the A image ADC period T903, and once the A+B image read period T902 is complete, the sequence moves to the A+B image ADC period T904. The A image signal and the A+B image signal are AD-converted, and A image data and A+B image data are generated as a result.

After the A image ADC period T903 is complete, the sequence moves to a period for A image ADC writing into the left-side A image memory 1000-*a* ("AF processing A image memory write period" hereinafter) T1100; and after the A+B image ADC period T904 is complete, the sequence moves to a period for A+B image ADC writing into the left-side A+B image memory 1001-*a* ("AF processing A+B image memory write period" hereinafter) T1101. As a result, the A image data and the A+B image data are held in the left-side A image memory 1000-*a* and the left-side A+B image memory 1001-*a*, respectively.

After the AF processing A image memory write period T1100 is complete, the sequences moves to a period T1102 for carrying out pre-processing, such as extracting a frequency component for AF detection through horizontal BPF processing or the like, on the A image held in the left-side A image memory 1000-*a* ("AF processing A image pre-processing period" hereinafter). After the AF processing A+B image memory write period T1101 is complete, the sequence moves to a period T1103 in which the B image is generated from the A image held in the left-side A image memory 1000-*a* and the A+B image held in the left-side A+B image memory 1001-*a* and pre-processing, such as extracting a frequency component for AF detection through horizontal BPF processing or the like, is carried out ("AF processing B image pre-processing period" hereinafter).

The data of the A image and the B image subjected to pre-processing in the AF processing A image pre-processing period T1102 and the AF processing B image pre-processing period T1103 is held in work memory (not shown). Through this, the phase difference AF correlation computation unit 1005-*a* completes preparations for using a correlation computation (a SAD computation, in the present embodiment) to find shift between the projection positions of images having disparity arising between the A image signal and the B image signal, which is described in FIG. 4.

After the above is complete, the sequence moves to a period T1104 in which a SAD computation is carried out on the pre-processed A image and B image held in the work memory (not shown) and a result of the SAD computation is written into the work memory (not shown) ("AF processing AB image SAD computation processing period" hereinafter). Through this, the SAD computation processing between the A image signal and the B image signal is completed for the first to fourth lines of the sensor RAW data.

Additionally, after the AF processing A+B image memory write period T1101 is complete, preparations for outputting the A+B image signal, which is the signal of the captured image, are complete as well. As such, the sequence moves to a period T1105 in which the A+B image held in the left-side A+B image memory 1001-*a* is subjected to sensor correction, and the first stacked sensor RAW output signal S100 and the second stacked sensor RAW output signal S101 are output from the left-side first output interface circuit 304-*a*1 and the left-side second output interface circuit 304-*a*2, respectively ("first and second stacked sensor RAW output period" hereinafter). The output of the first and second lines of the sensor RAW data to the exterior is completed as a result.

The flow described above is repeated starting with a timing t-1101 of the start of processing of the fifth to eighth lines of the sensor RAW data, a timing t-1102 of the start of processing of the ninth to 12th lines of the sensor RAW data, and a timing t-1103 of the start of processing of the 13th to 16th lines of the sensor RAW data.

FIG. 12 is a processing timing chart of the right-side digital signal processing circuit 302-*b* (corresponding to four horizontal processes).

The timing t-1100 of the start of processing of the first to fourth lines of the sensor RAW data, the timing t-1101 of the start of processing of the fifth to eighth lines of the sensor RAW data, the timing t-1102 of the start of processing of the ninth to 12th lines of the sensor RAW data, and the timing t-1103 of the start of processing of the 13th to 16th lines of the sensor RAW data correspond to the operations of the left-side digital signal processing circuit 302-*a* illustrated in FIG. 11.

The flow through which the A image data and the A+B image data are held in the right-side A image memory 1000-*b* and the right-side A+B image memory 1001-*b* is the same as well. Descriptions of a period T1200 for A image ADC writing into the right-side A image memory 1000-*b* ("tracking processing A image memory write period" hereinafter) and a period T1201 for A+B image ADC writing into the right-side A+B image memory 1001-*b* ("tracking processing A+B image memory write period" hereinafter) will therefore be skipped.

After the tracking processing A+B image memory write period T1201 is complete, the sequence moves to a period T1202 in which the A+B image held in the right-side A+B image memory 1001-*b* is subject to horizontal resizing and vertical bandwidth limitation processing ("tracking processing horizontal resizing period" hereinafter). During this period, the A+B image held in the right-side A+B image memory 1001-*b* is reduced horizontally. The image is reduced to $1/16$ in the present embodiment, although this is not illustrated.

The sequence moves to a period T1203 for vertical bandwidth limitation, vertical thinning, and writing to work memory (not shown) ("tracking processing vertical resizing period" hereinafter), in parallel with only the tracking processing horizontal resizing period T1202 starting with the timing t-1103 of the start of processing of the 13th to 16th lines of the sensor RAW data.

Next, the sequence moves to a period T1204 in which a SAD computation is carried out on a resized image for tracking processing and a template image held in work memory (not shown), and a result of the SAD computation is written into work memory (not shown) ("tracking processing SAD computation processing period" hereinafter).

After the tracking processing A+B image memory write period T1201 is complete, preparations for outputting the A+B image signal, which is the signal of the captured image, are complete as well. As such, the sequence moves to a period T1205 in which the A+B image held in the right-side A+B image memory 1001-*b* is subjected to sensor correction, and the third stacked sensor RAW output signal S102 and the fourth stacked sensor RAW output signal S103 are output from the right-side first output interface circuit 304-*b*1 and the right-side second output interface circuit 304-*b*2, respectively ("third and fourth stacked sensor RAW output period" hereinafter). The output of the third and fourth lines of the sensor RAW data to the exterior is completed as a result.

The flow described above is repeated starting with a timing t-1101 of the start of processing of the fifth to eighth lines of the sensor RAW data, a timing t-1102 of the start of processing of the ninth to 12th lines of the sensor RAW data, and a timing t-1103 of the start of processing of the 13th to 16th lines of the sensor RAW data.

FIG. 13 is a processing timing chart (illustrating one frame's worth of processing) of the left-side digital signal processing circuit 302-*a* and the right-side digital signal processing circuit 302-*b* illustrated in FIG. 10.

In FIG. 13, reference sign 13A indicates a processing timing chart of the left-side digital signal processing circuit 302-*a* (one frame's worth of processing); 13B, the timing at which the AF frame position and image shift amount S1010 is generated by the left-side CPU 1006-*a*; 13C, a processing timing chart from before the vertical resizing (reduction) of the right-side digital signal processing circuit 302-*b* (one frame's worth of processing); 13D, a processing timing chart from after the vertical resizing (reduction) of the right-side digital signal processing circuit 302-*b* (one frame's worth of processing); 13E, a timing chart of the tracking SAD computation processing by the right-side digital signal processing circuit 302-*b* (one frame's worth of processing); and 13F, the timing at which the right-side CPU 1006-*b* generates the object position and movement information S118 and template update information S1011.

As described with reference to FIGS. 11 and 12, the left-side digital signal processing circuit 302-*a* processes the first, second, fifth, sixth, ninth, 10th, 13th, and 14th lines of the sensor RAW data starting with t-1100, and the right-side digital signal processing circuit 302-*b* processes the third, fourth, seventh, eighth, 11th, 12th, 15th, and 16th lines of the sensor RAW data starting with t-1100.

In the left-side digital signal processing circuit 302-a, the AF processing AB image SAD computation processing period T1104 occurs for all lines at t-1100, t-1101, t-1102, t-1103, and thereafter. The tracking processing horizontal resizing period T1202 occurs in the same manner in the right-side digital signal processing circuit 302-b. This is expressed by 13A and 13C in FIG. 13.

In the right-side digital signal processing circuit 302-b, the processing of the tracking processing vertical resizing period T1203 is carried out when, of t-1100, t-1101, t-1102, and t-1103, t-1103 is at the start, in addition to 13C of FIG. 13. This is expressed by 13D in FIG. 13.

Furthermore, timing t-1304 indicates a timing at which, in the right-side digital signal processing circuit 302-b, the processing of 13D in FIG. 13 has progressed and an amount of resized images for tracking processing sufficient for the tracking processing SAD computation to be carried out with the template image has been prepared in the work memory (not shown). From that timing t-1304, preparations for template matching processing (a SAD computation, in the present embodiment) are complete in the object tracking correlation computation unit 1005-b.

After t-1304, following the tracking processing vertical resizing period T1203 illustrated in FIG. 12, the sequence moves to the period T1204, in which a SAD computation is carried out on the resized image for tracking processing and the template image held in the work memory (not shown) and the result of the SAD computation is written into the work memory (not shown) (the tracking processing SAD computation processing period), and the template matching processing is executed. This is expressed by 13E in FIG. 13.

One frame's worth of the processing indicated by 13A, 13C, 13D, and 13E being complete corresponds to a timing t-1300 at which the generation of the image shift map S1009 and the motion shift amount S1012 is complete.

Note that the image shift map S1009 and the motion shift amount S1012 do not have to be generated at exactly the same timing.

After the timing of t-1300, the left-side CPU 1006-a and the right-side CPU 1006-b carry out the imaging plane phase difference-based AF preprocessing function and the object tracking processing function in an alternating manner via the CPU bus line 306, at a timing t-1301 at which the right-side CPU 1006-b completes the generation of the object position and movement information S118, a timing t-1302 at which the left-side CPU 1006-a completes the generation of the AF frame position and image shift amount S1010, and a timing t-1303 at which the right-side CPU 1006-b completes the generation of the template update information S1011. This is expressed by 13B and 13F in FIG. 13.

Figure 14A:
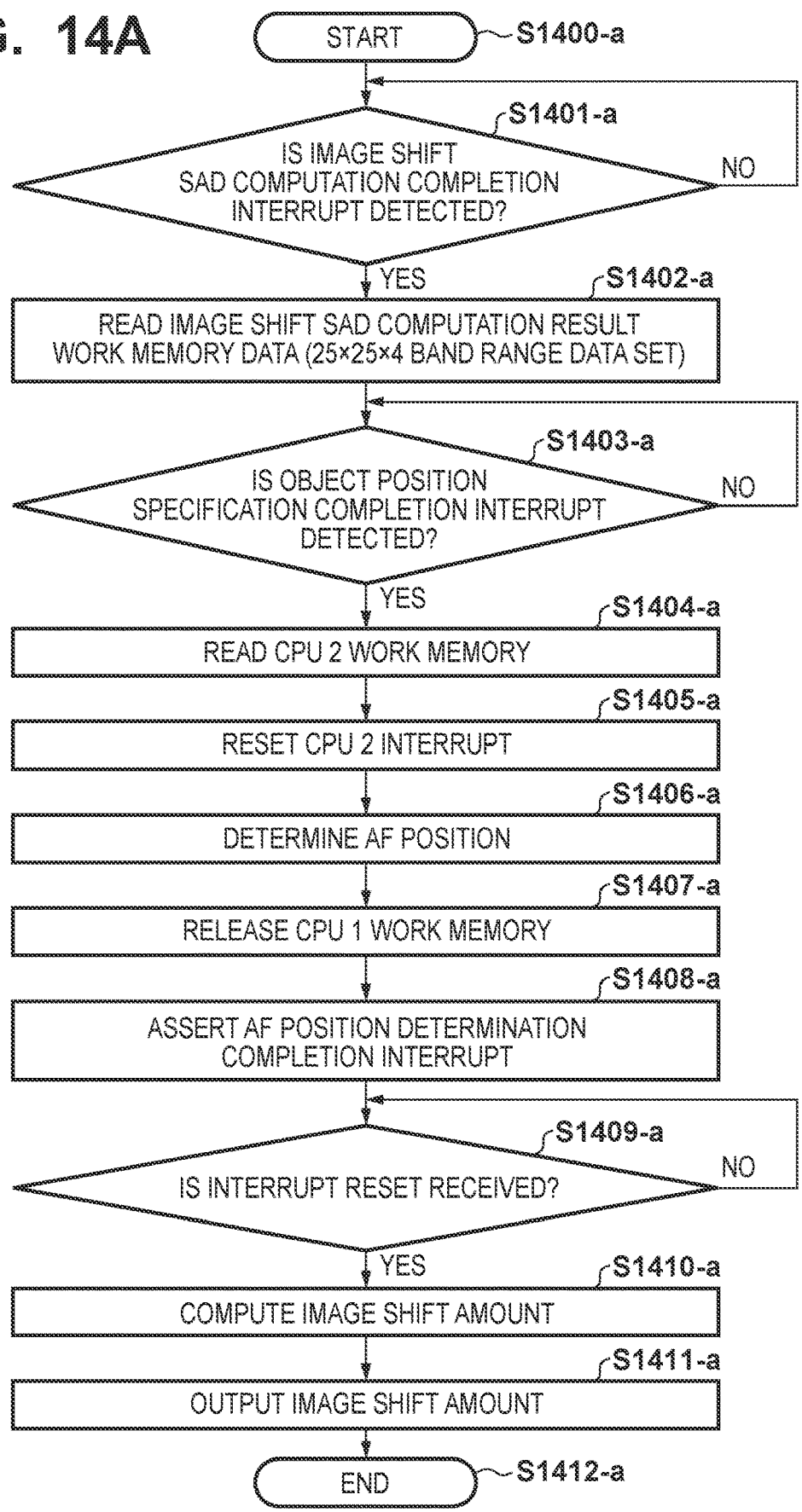
FIG. 14A is a processing flowchart of a digital signal processing circuit and a left-side CPU.
Figure 14B:
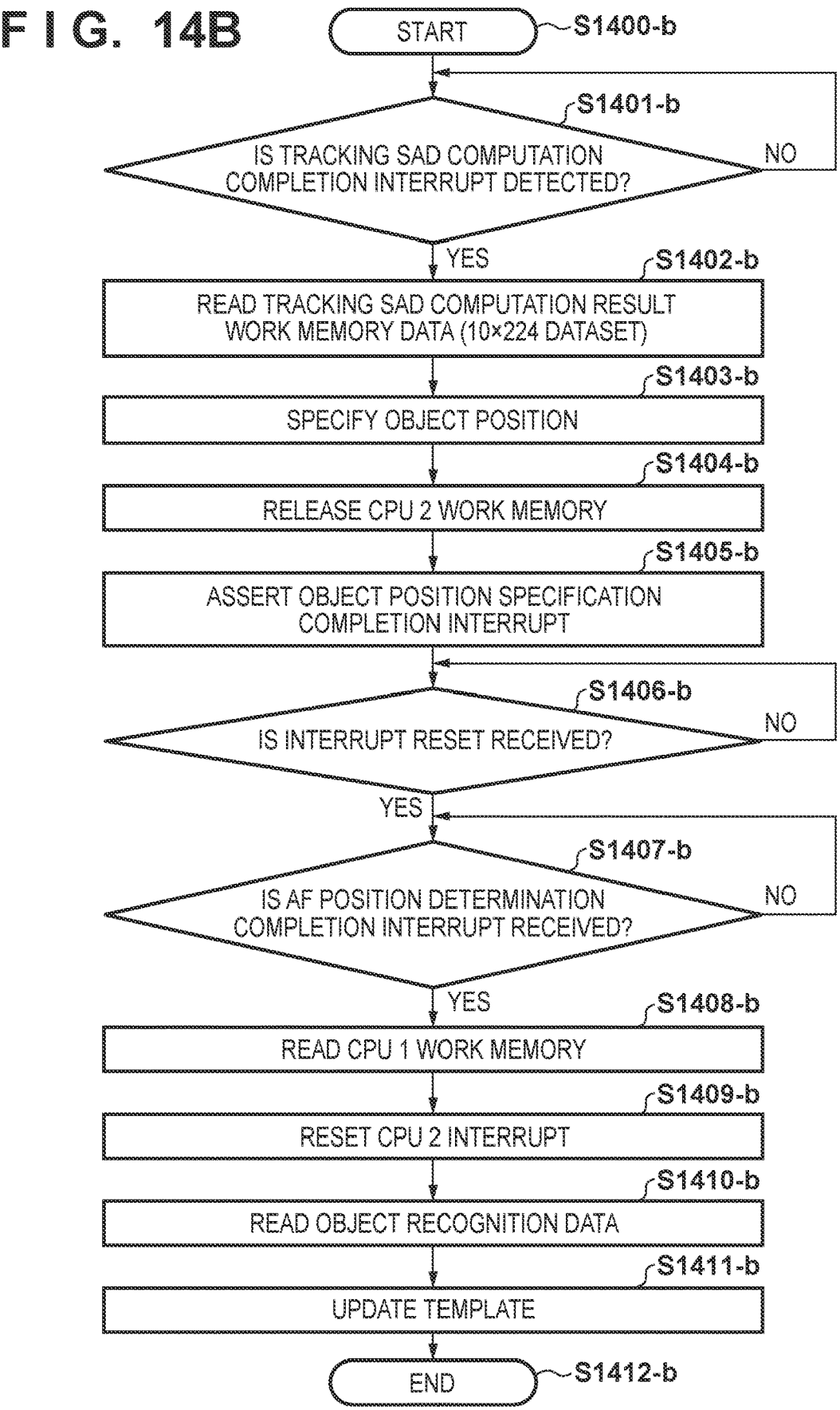
FIG. 14B is a processing flowchart of a digital signal processing circuit and a right-side CPU.

FIG. 14A is a processing flowchart of the left-side digital signal processing circuit 302-a and the left-side CPU 1006-a. FIG. 14B is a processing flowchart of the right-side digital signal processing circuit 302-b and the right-side CPU 1006-b. Step 1400-a and step 1400-b are the steps at which the left-side CPU 1006-a and the right-side CPU 1006-b start processing, respectively. The respective CPUs stand by for the processing by the left-side digital signal processing circuit 302-a and the right-side digital signal processing circuit 302-b to be completed, through an AF image shift SAD computation completion interrupt standby ("image shift SAD computation completion interrupt standby" hereinafter) step 1401-a by the left-side digital signal processing circuit 302-a and a tracking SAD computation completion interrupt standby step 1401-b by the right-side digital signal processing circuit 302-b.

Upon detecting the image shift computation completion interrupt S1013, the left-side CPU 1006-a proceeds to an AF image shift SAD computation result read step 1402-a, and loads the image shift map S1009 obtained from one frame's worth of processing into work memory of the left-side CPU 1006-a (not shown).

The left-side CPU 1006-a then proceeds to an object position specification completion interrupt standby step 1403-a of standing by for the stated interrupt from the right-side CPU 1006-b, and stands by for a state in which object position information can be referred to.

Upon detecting the tracking SAD computation completion interrupt S1014, the right-side CPU 1006-b proceeds to a tracking image shift SAD computation result read step 1402-b, and loads the motion shift amount S1012 obtained from one frame's worth of processing into work memory of the right-side CPU 1006-b (not shown).

The right-side CPU 1006-b then proceeds to an object position specification process step 1403-b, where a current object position and an object motion amount are specified from the motion shift amount S1012, stored in the work memory of the right-side CPU 1006-b as the object position and movement information S118, and also output to the exterior via the right-side CPU bus arbitration circuit 1007-b and the right-side CPU external interface circuit 1008-b.

The right-side CPU 1006-b then proceeds to a right-side CPU 1006-b work memory release step 1404-b, where preparations for handling access by the left-side CPU 1006-a are completed. A step 1405-b of asserting the object position specification completion interrupt S1015 is then carried out, after which the sequence moves to step 1406-b of standing by for an interrupt reset caused by the left-side CPU 1006-a referring to the object position ("object position reference reset standby" hereinafter).

When the left-side CPU 1006-a, which is in the object position specification completion interrupt standby step 1403-a, detects the object position specification completion interrupt S1015 from the right-side CPU 1006-b, the left-side CPU 1006-a proceeds to a right-side CPU 1006-b work memory read step 1404-a, where the object position and movement information S118 is read from the work memory of the right-side CPU 1006-b (not shown).

Once the reading of the object position and movement information S118 is complete, the left-side CPU 1006-a executes an interrupt reset step 1405-a to the right-side CPU 1006-b, and then proceeds to an AF position determination process step 1406-a.

In response to the interrupt reset step 1405-a from the left-side CPU 1006-a, the right-side CPU 1006-b, which is in the object position reference reset standby step 1406-b, proceeds to an AF position determination completion interrupt S1016 standby step 1407-b.

The image shift map S1009, which is obtained in the AF image shift SAD computation result read step 1402-a, is merely a map form obtained by finding the shift between the projection positions of images having disparity between the A image signal and the B image signal, for each of a plurality of small blocks set in a matrix in the screen. As such, which position should be used to refer to the image shift information, among the image shift information in a plurality of positions, cannot be determined from that map alone. The AF frame position and image shift amount S1010 required for AF can be determined by referring to the object position and movement information S118 obtained from the right-side CPU 1006-b.

Next, the left-side CPU 1006-*a* stores the AF frame position and image shift amount S1010 in the work memory of the left-side CPU 1006-*a* (not shown).

The left-side CPU 1006-*a* then proceeds to a left-side CPU 1006-*a* work memory release step 1406-*a*, where preparations for handling access by the right-side CPU 1006-*b* are completed. A step 1408-*a* of asserting the AF position determination completion interrupt S1016 is then carried out, after which the sequence moves to step 1409-*a* of standing by for an interrupt reset caused by the right-side CPU 1006-*b* referring to the AF position ("AF position reference reset standby" hereinafter).

In response to the AF position determination completion interrupt S1016 from the left-side CPU 1006-*a*, the right-side CPU 1006-*b*, which is in the AF position determination completion interrupt S1016 standby step 1407-*b*, reads the AF frame position and image shift amount S1010 from the work memory of the left-side CPU 1006-*a* (not shown) (step 1408-*b*).

Once the reading of the AF frame position and image shift amount S1010 is complete, the right-side CPU 1006-*b* executes an interrupt reset step 1409-*b* to the left-side CPU 1006-*a*, and then proceeds to an object recognition information S116 reference step 1410-*b*.

The left-side CPU 1006-*a*, which is in the AF position reference reset standby step 1409-*a*, proceeds to an image shift amount computation process step 1410-*a*, where an image shift amount S1010 at the AF frame position required for AF is found from the object position and movement information S118 obtained from the right-side CPU 1006-*b*. Then, in an image shift amount result output step 1411-*a*, the image shift amount S1010 is output to the exterior as the image shift amount S111 via the left-side CPU bus arbitration circuit 1007-*a* and the left-side CPU external interface circuit 1008-*a*.

The sequence then moves to a left-side CPU 1006-*a* processing complete step 1412-*a*, where the processing ends.

Having proceeded to the object recognition information S116 reference step 1410-*b*, the right-side CPU 1006-*b* uses the object recognition information S116 from the object recognizing unit 115, the AF frame position and image shift amount S1010, and the object position and movement information S118 which had been held in the work memory of the right-side CPU 1006-*b* to update the template used in the tracking SAD computation carried out by the right-side digital signal processing circuit 302-*b* in the next frame.

The object position and movement information S118, which had been held in the work memory of the right-side CPU 1006-*b*, is the object position obtained as a result of the template matching, and therefore does not necessarily have the same coordinates as the AF frame position in the AF frame position and image shift amount S1010. Likewise, the coordinates in the object position and movement information S118 do not necessarily match the coordinates specified by the object recognition information S116 found by the object recognizing unit 115, and thus the template is updated on the basis of these pieces of information. Step 1411-*b* of updating the template is carried out in work memory of the right-side digital signal processing circuit 302-*b* (not shown).

The right-side CPU 1006-*b* then proceeds to a right-side CPU 1006-*b* processing complete step 1412-*b*, where the processing ends.

Reference sign 15A in FIG. 15 indicates a sequence of image output by the stacked image sensor 102, output of the image shift amount S111, and output of the object position and movement information S118. 15B in FIG. 15 indicates a sequence of calculating the defocus correction amount, calculating the defocus amount S113, and driving the focus lens; 15C, a sequence of calculating an imager IS control amount and outputting the sensor position drive signal S119; and 15D, a sequence of generating the YUV image for display S106 and the YUV image for evaluation S107. 15E indicates a sequence of generating the object recognition information S116; 15F, a sequence of displaying a live view ("LV image" hereinafter); and 15G, a sequence of capturing and generating a still image and carrying out recording processing.

T1500 is a period in which the stacked image sensor 102 outputs the LV, the image shift amount S111 is output, and the object position and movement information S118 is output ("sensor LV driving period" hereinafter), as described with reference to FIGS. 11, 12, 13, 14A, and 14B.

The period starts at the timing t-1100 of the start of processing of the first to fourth lines of the sensor RAW data, and lasts until the timing t-1303 at which the generation of the template update information S1011 by the right-side CPU 1006-*b* is complete.

T1501 is a period in which the defocus amount calculating unit 113 calculates the defocus correction amount ("defocus correction amount calculation period" hereinafter). This is a period in which the defocus correction amount is found from the distance conversion coefficient and defocus correction data S112 and the lens state S110 obtained via the memory IF unit 116, as described with reference to FIG. 1, and can be started from a lens state confirmation timing t-1500.

T1502 is a period in which the defocus amount calculating unit 113 calculates the defocus correction amount ("defocus amount calculation period" hereinafter). In T1502, the defocus correction amount found in the defocus correction amount calculation period T1501 is multiplied by the distance conversion coefficient of the distance conversion coefficient and defocus correction data S112 for the image shift amount S111 to find a defocus amount. That defocus amount is corrected using the defocus correction amount to generate the defocus amount S113.

In the defocus amount calculation period T1502, the image shift amount S111 from the stacked image sensor 102 is also necessary, and thus the period T1502 starts after the image shift amount result output step 1411-*a* (essentially the same as the timing t-1303 at which the generation of the template update information S1011 by the right-side CPU 1006-*b* is completed).

After the defocus amount S113 is generated, the focus is adjusted by driving the focus lens in response to the focus lens drive signal S114 from the lens control unit 114. If a still image shooting (S2) instruction is made during this period, e.g., at t-1502, the focus adjustment is completed by a still image shooting start timing t-1503, and the shooting of the still image is then started.

T1509 is a period in which the stacked image sensor 102 shoots a still image, and is longer than the sensor LV driving period T1500. The main reason for this is that during the AD conversion in the column circuit and column ADC 701, a deeper bit depth is used than in the sensor LV driving, and the AD conversion takes longer as a result.

T1504 is a period for calculating an imager IS control amount for image IS, carried out by the IS control unit 112 ("imager IS control amount calculation period" hereinafter); T1505, meanwhile, is a period for driving the sensor actuator 103 and an image stabilization processing period, as described earlier. These periods are completed by the still image shooting start timing t-1503. Note that t-1501 indicates a gyrosensor output S117 reference timing.

T1506 is a period in which the image processing unit 110 generates the YUV image for display S106 and the YUV image for evaluation S107 ("LV image generation period" hereinafter), and a period in which the object recognizing unit 115 generates the object recognition information S116 ("object recognition period" hereinafter) T1507 is carried out in parallel with the LV image generation period T1506. The object recognition information S116, which is found through the object recognition period T1507, is referred to in step 1411-*b*, in which the template is updated for the next frame.

Finally, T1508 is a period in which the display device 107 displays the LV image; T1510 is a period in which the image processing unit 110 processes the still image; and T1511 is a period in which still image recording processing is carried out by the recording signal processing unit 111.

According to the first embodiment of the present invention as described thus far, different functions, namely the imaging plane phase difference-based AF preprocessing function and the object tracking processing function, can be distributed between the left and right CPUs 1006-*a* and 1006-*b*, and the left and right digital signal processing circuits 302-*a* and 302-*b*, which are formed with the same respective configurations through stepping exposure. Furthermore, by referring to each others' processing results via the CPU bus line 306 constituted by interconnects formed through one-shot exposure, these elements can both carry out continuous AF while tracking an object to be shot, within a single stacked image sensor. This makes it possible to further improve the object tracking and AF performance, which require quick response times.

Second Embodiment

The foregoing first embodiment described an example in which a CPU bus is formed by one-shot exposure in the logic unit of a stacked image sensor, and object tracking/image plane phase difference AF are carried out by effectively using a plurality of CPUs formed by stepping exposure.

The present second embodiment will describe an example of effectively using the capacity of internal SRAM by forming a memory bus such as SRAM in the logic unit of a stacked image sensor through one-shot exposure, in terms of a missing pixel correction function. Note that the pixel chip-side structure of the stacked image sensor 102 is the same as in the first embodiment and will therefore not be described.

Figure 16:
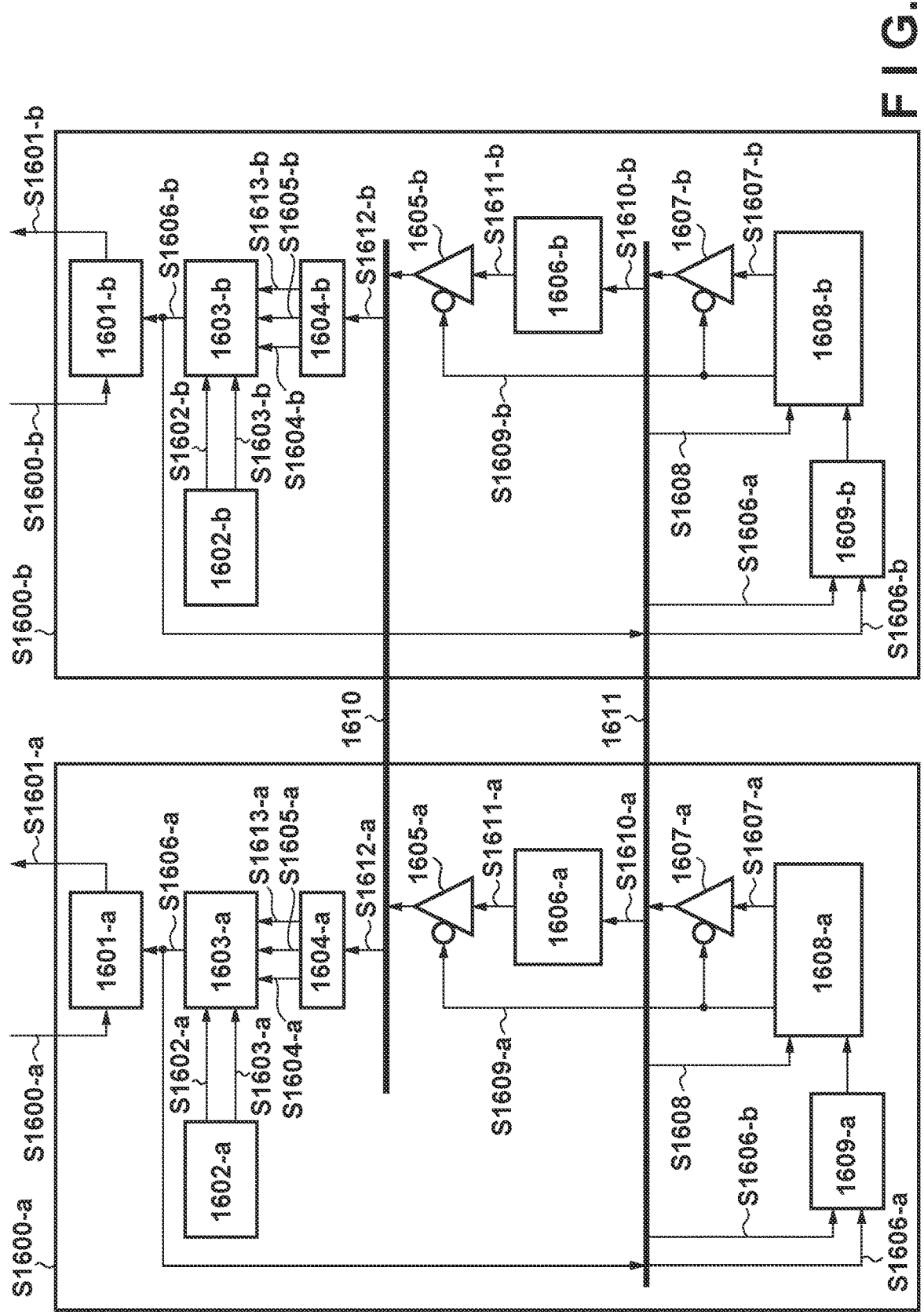
FIG. 16 is a diagram illustrating an example of applying the present invention to an image sensor according to a second embodiment.

FIG. 16 illustrates an example of the configuration of a missing pixel correction processing circuit and a memory bus, corresponding to a left-side digital signal processing circuit 1600-*a* and a right-side digital signal processing circuit 1600-*b*, in a logic unit according to the present second embodiment.

In FIG. 16, the actions and meanings of the constituent elements and signals in the right-side digital signal processing circuit 1600-*b* are the same as those of the left-side digital signal processing circuit 1600-*a*, and thus only the left-side digital signal processing circuit 1600-*a* will be described, with the differences being mentioned later.

Missing pixel position memory 1606-*a* is memory that pre-stores missing pixel data, which expresses position information of missing pixels to be corrected, in the order in which the pixels are driven in the sensor. A memory address control circuit 1608-*a* generates addresses of the missing pixel position memory 1606-*a*. Accordingly, the missing pixel data stored in an address of the missing pixel position memory 1606-*a* specified by the memory address control circuit 1608-*a* is output. A missing pixel position data buffer 1604-*a* is a buffer that holds a plurality of pieces of the missing pixel data read out from the missing pixel position memory 1606-*a*. It is assumed that sequential missing pixel data can be handled even if the readout latency of the missing pixel position memory 1606-*a* is greater than one cycle.

A pixel position counter circuit 1602-*a* generates a horizontal pixel position counter value 1602-*a* and a vertical pixel position counter value 1603-*a*, which indicate the pixel position of a pre-correction R/Gr pixel S1600-*a*.

A pixel position comparing circuit 1603-*a* compares the horizontal pixel position counter value 1602-*a* and the vertical pixel position counter value 1603-*a* with a missing pixel horizontal position S1604-*a* and a missing pixel vertical position S1605-*a* held in the missing pixel position data buffer 1604-*a*, and asserts a missing pixel correction flag S1606-*a* when the respective positions match.

A missing pixel correction circuit 1601-*a* takes the pre-correction R/Gr pixel S1600-*a* as an input, carries out interpolation processing through a known interpolation method such as same-color pre-interpolation if the missing pixel correction flag S1606-*a* is asserted, and outputs the pixel as a post-correction R/Gr pixel S1601-*a* without carrying out any processing if the missing pixel correction flag S1606-*a* is not asserted.

Accordingly, when the pre-correction R/Gr pixel S1600-*a* input to the missing pixel correction circuit 1601-*a* is a missing pixel, the missing pixel correction flag S1606-*a* is asserted, whereas if the pre-correction R/Gr pixel S1600-*a* input to the missing pixel correction circuit 1601-*a* is not a missing pixel, the missing pixel correction flag S1606-*a* is not asserted. As such, the missing pixel correction circuit 1601-*a* carries out the interpolation processing only on missing pixels for which correction is necessary.

Additionally, the missing pixel correction flag S1606-*a* also serves as a trigger for updating the missing pixel data held in the missing pixel position data buffer 1604-*a*. The flag is therefore also input to the memory address control circuit 1608-*a*, and the address of the missing pixel position memory 1606-*a* is updated.

A correction control loop structure is realized by outputting new missing pixel data from the missing pixel position memory 1606-*a* for which the address has been updated, updating the missing pixel data held in the missing pixel position data buffer 1604-*a* as well, and standing by for the next assertion of the missing pixel correction flag S1606-*a*.

An example of the structure of the missing pixel data stored in the left-side missing pixel position memory 1606-*a* and a right-side missing pixel position memory 1606-*b* will be described next with reference to FIGS. 17A to 17C.

FIG. 17A illustrates the image format of a RAW image in the pixel chip of the stacked image sensor according to the present embodiment. There are 8192 horizontal pixels and 4096 vertical pixels, and in a single clock cycle, sensor RAW data is read out in a 2×2 shape for R/Gr/Gb/B. R/Gr pixels are input to the left-side digital signal processing circuit 1600-*a*, and Gb/B pixels are input to the right-side digital signal processing circuit 1600-*b*. Accordingly, in the left and right digital signal processing circuits 1600-*a* and 1600-*b*, R/Gr and Gb/B pixels are supplied and output simultaneously in a single clock cycle.

FIG. 17B illustrates the format of the missing pixel data stored in the left-side missing pixel position memory 1606-*a* and the right-side missing pixel position memory 1606-*b*, according to the present embodiment.

One word is made up of 27 bits, with the four bits from bit 26 to 23 indicating a Color-ID, the 12 bits from bit 22 to 11 indicating a horizontal pixel position (in units of clock cycles), and the 11 bits from bit 10 to 0 indicating a vertical pixel position (in units of clock cycles). These are expressed by missing pixel color ID S1613-*a* and S1613-*b*, missing pixel horizontal positions S1604-*a* and S1604-*b*, and missing pixel vertical positions S1605-*a* and S1605-*b*.

Note that the four bits in Color-ID are associated with R, Gb, Gr, and B, respectively. Additionally, 8192 pixels are arranged in the horizontal direction in the image sensor according to the embodiment, and thus 13 bits are necessary to address a single pixel in the horizontal direction. However, the left-side digital signal processing circuit 1600-*a* processes even numbers in the horizontal direction, i.e., addresses 0, 2, 4, and so on, and thus the address can be specified by half, i.e., 12 bits. Additionally, the image sensor has 4096 pixels in the vertical direction, and thus 12 bits are necessary to address a single pixel. However, the left-side digital signal processing circuit 1600-*a* carries out processing in units of two pixels {R, Gb} adjacent in the vertical direction, and the vertical direction addresses of the pixels above the stated pixels are located at even numbers, i.e., 0, 2, 4, and so on, and thus half, i.e., 11 bits, is sufficient. The right-side digital signal processing circuit 1600-*b* is different only in that it processes the odd-numbered pixels in the horizontal direction of the image sensor, and thus the right-side missing pixel position memory 1606-*b* can also be understood as handling 27 bits for one word.

FIG. 17C illustrates the configuration of the missing pixel position memory 1606-*a* and a missing pixel position memory 1606-*b* according to the present embodiment. Each word is 27 bits, and each memory holds 4096 words. In other words, a total of up to 8192 pieces of missing pixel data can be stored.

As described above, R/Gr pixels adjacent in the vertical direction are supplied to the left-side digital signal processing circuit 1600-*a*, and Gb/B pixels adjacent in the vertical direction are supplied to the right-side digital signal processing circuit 1600-*b*.

On the other hand, the missing pixel itself is a missing pixel in the pixel unit, and thus there is no guarantee that the R/Gr/Gb/B pixels will each appear equally. Thus in the present embodiment, both the left-side missing pixel position memory 1606-*a* and the right-side missing pixel position memory 1606-*b* store the R/Gr/Gb/B missing pixel data without distinguishing between that data. Furthermore, that missing pixel data can be shared between the left-side missing pixel position memory 1606-*a* and the right-side missing pixel position memory 1606-*b* through a one-shot interconnect data bus 1610, a one-shot interconnect address bus 1611, a left-side memory data bus access arbitration circuit 1605-*a*, a right-side memory data bus access arbitration circuit 1605-*b*, a left-side memory address bus access arbitration circuit 1607-*a*, and a right-side memory address bus access arbitration circuit 1607-*b*.

In other words, the missing pixel data, corresponding to up to 4096 of the Color-ID, the horizontal pixel position, and the vertical pixel position, are stored in the left-side missing pixel position memory 1606-*a* from the sensor in the order in which the pixels are driven, regardless of R/Gr/Gb/B; and up to the remaining 4096, continuing in order from the 4096th in the left-side missing pixel position memory 1606-*a*, are then stored in the right-side missing pixel position memory 1606-*b*.

The left-side pixel position comparing circuit 1603-*a* sets the left-side missing pixel correction flag S1606-*a* to 1 if the R or Gr bit of the Color-ID is 1 in the missing pixel data stored in the left and right missing pixel position memory 1606-*a* and 1606-*b*, and the right-side pixel position comparing circuit 1603-*b* sets the right-side missing pixel correction flag S1606-*b* to 1 if the Gb or B bit of the Color-ID is 1. As a result, the left-side missing pixel correction circuit 1601-*a* and the right-side missing pixel correction circuit 1601-*b* can correct the missing pixels those respective circuits are to correct.

In accordance with these operations of the left and right pixel position comparing circuits 1603-*a* and 1603-*b*, the left-side memory address control circuit 1608-*a* updates the addresses in the left and right missing pixel position memory 1606-*a* and 1606-*b* in accordance with both the left-side missing pixel correction flag S1606-*a* and the right-side missing pixel correction flag S1606-*b*.

In other words, the above-described address update is realized by the left-side digital signal processing circuit 1600-*a* referring to the right-side missing pixel correction flag S1606-*b* and the right-side digital signal processing circuit 1600-*b* referring to the left-side missing pixel correction flag S1606-*a* through the one-shot interconnect address bus 1611, and an OR result being found for each by a left-side OR circuit 1609-*a* and a right-side OR circuit 1609-*b*, respectively.

Furthermore, the left-side missing pixel correction flag S1606-*a* or the right-side missing pixel correction flag S1606-*b* being asserted in a state where the addresses generated by the left-side memory address control circuit 1608-*a* are counted up to 4095 is detected using an address monitoring signal 51608, and a left-side bus access arbitration signal S1609-*a* and a right-side bus access arbitration signal S1609-*b* are switched. As a result, which of a read address input S1610-*a* of the left-side missing pixel position memory 1606-*a* and a read address input S1610-*b* of the right-side missing pixel position memory 1606-*b* is to be activated can be designated on the one-shot interconnect address bus 1611.

Likewise, which of a data output S1611-*a* of the left-side missing pixel position memory 1605-*a* and a data output S1611-*b* of the right-side missing pixel position memory 1605-*b* is to be activated can be designated on the one-shot interconnect data bus 1610.

Through the operations described above, the left-side missing pixel position memory 1606-*a* and the right-side missing pixel position memory 1606-*b* can be shared, and thus memory constituted by the left-side digital signal processing circuit 1600-*a* and the right-side digital signal processing circuit 1600-*b* formed through stepping exposure can be utilized effectively.

The effects of a CPU bus structure using interconnects formed through one-shot exposure have been described in the first embodiment, and a memory bus configuration using interconnects formed through one-shot exposure has been described in the second embodiment. The present embodiment also includes a configuration using interconnects formed through one-shot exposure for both the CPU bus and the memory bus.

Third Embodiment

The first embodiment described an example in which a CPU bus is formed by one-shot exposure in the logic unit of a stacked image sensor, and object tracking/image plane phase difference AF are carried out by effectively using a plurality of CPUs formed by stepping exposure.

The present third embodiment will describe an example in which power consumption is leveled with respect to time by switching the functions of a plurality of signal processing circuits and CPUs formed through stepping exposure in predetermined intervals of time, using the object tracking/image plane phase difference AF of the first embodiment as an example.

Figure 18:
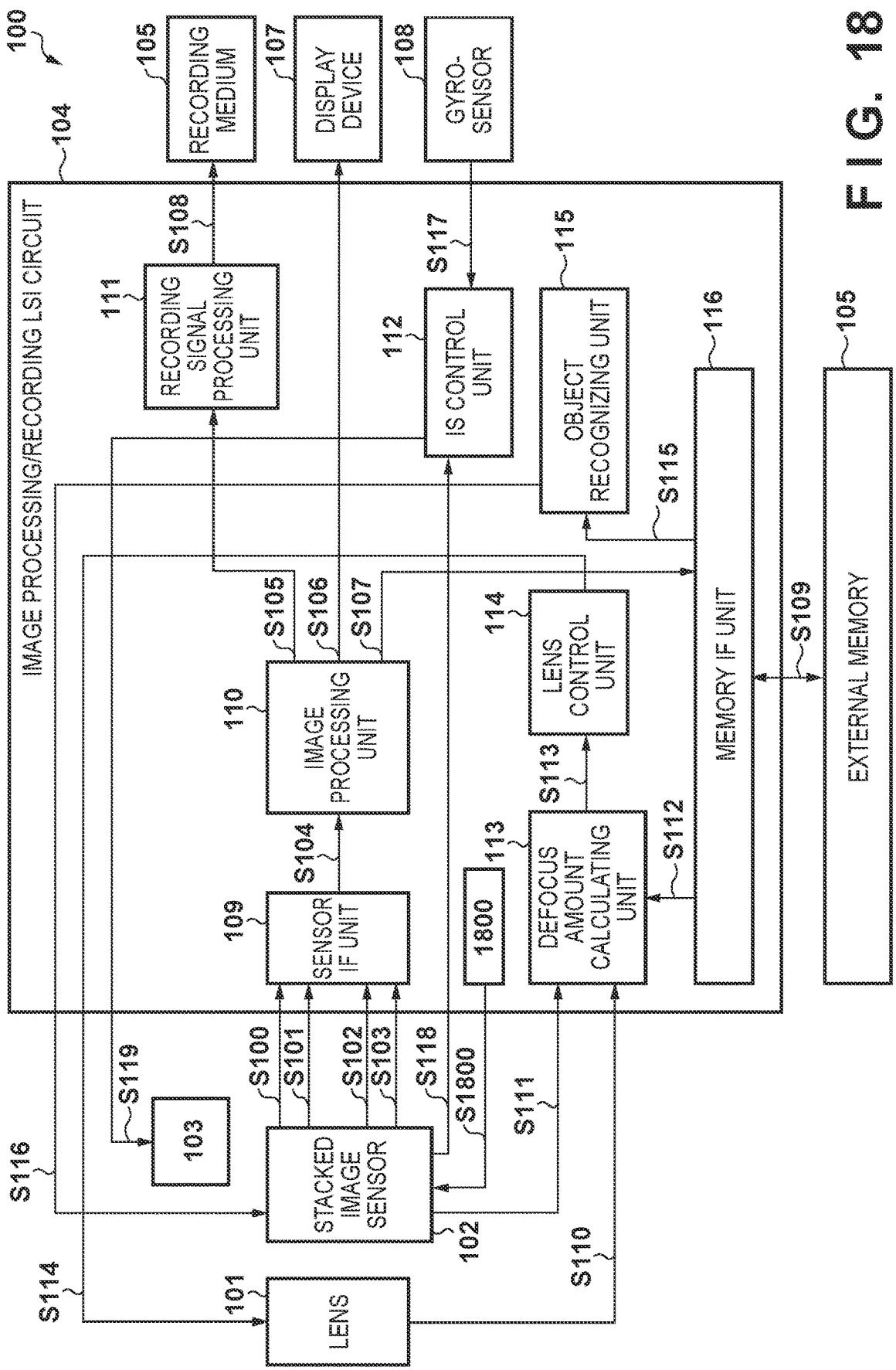
FIG. 18 is a diagram illustrating an example of applying the present invention to an image sensor and an image recording apparatus according to a third embodiment.

FIG. 18 is a block diagram illustrating an image capturing apparatus according to the third embodiment. In FIG. 18, reference signs 100 to 116 are the same as in FIG. 1 (the first embodiment), and will therefore not be described.

In the present third embodiment, a sensor logic function switching control unit 1800 is provided as an additional configuration. As will be described later, this sensor logic function switching control unit 1800 asserts a sensor logic function switching control signal S1800 and transmits that signal to the stacked image sensor 102 each time the LV driving period T1500 of the stacked image sensor 102 ends, or, as will be described later in a fourth embodiment, at a predetermined timing such as the timing at which the still image capturing period T1509 of the stacked image sensor 102 ends.

The stacked image sensor 102 is the same as in the first embodiment in that the configuration is the same as in FIGS. 2 to 8 and image capturing operations are carried out according to the operation timing chart illustrated in FIG. 9.

Figure 19:
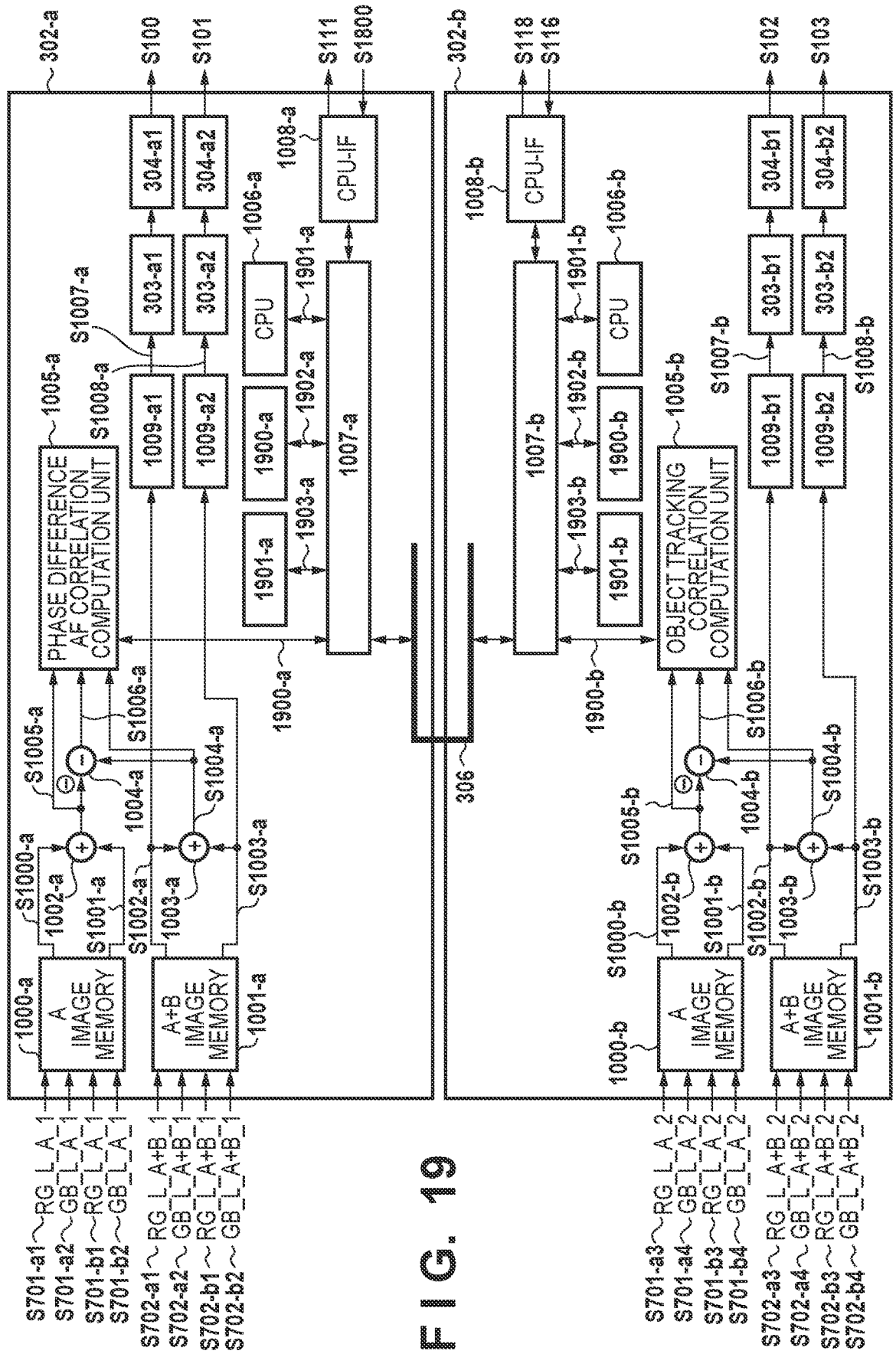
FIG. 19 is a diagram illustrating, in detail, a left-side digital signal processing circuit and a right-side digital signal processing circuit.

FIG. 19 is a diagram illustrating, in detail, the left-side digital signal processing circuit 302-a and the right-side digital signal processing circuit 302-b illustrated in FIG. 3, and constituent elements and signals that are the same as in the first embodiment are given the same reference signs as in FIG. 10.

In FIG. 19, 1900-a indicates left-side CPU system memory, 1900-b indicates right-side CPU system memory, 1901-a indicates left-side CPU-ROM, and 1901-b indicates right-side CPU-ROM. Additionally, S1900-a indicates RAM communication data for AF, S1901-a indicates a left-side CPU bus, S1902-a indicates a left-side CPU system memory bus, S1903-a indicates a left-side CPU-ROM bus, S1900-b indicates RAM communication data for tracking, S1901-b indicates a right-side CPU bus, S1902-b indicates a right-side CPU system memory bus, and S1903-b indicates a right-side CPU-ROM bus.

Figure 20:
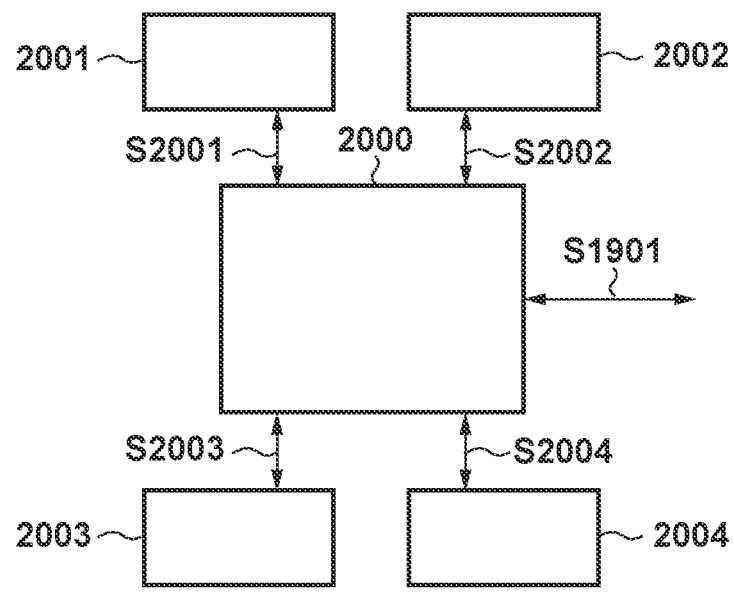
FIG. 20 is a diagram illustrating, in detail, the left-side CPU and the right-side CPU.

FIG. 20 is a diagram illustrating the left-side CPU 1006-a and the right-side CPU 1006-b of FIG. 19 in detail. 2000 indicates a processor core unit, 2001 indicates command RAM, 2002 indicates a command cache, 2003 indicates data RAM, and 2004 indicates a data cache. Additionally, S2001 indicates a command RAM signal bus, S2002 indicates a command cache signal bus, S2003 indicates a data RAM signal bus, and 52004 indicates a data cache signal bus.

Figure 21A:
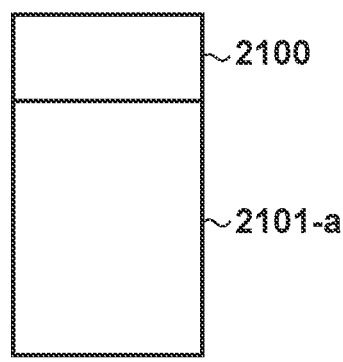
FIG. 21A is a diagram illustrating an address map of ROM in the left-side CPU.
Figure 21B:
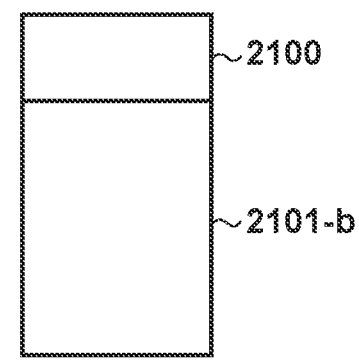
FIG. 21B is a diagram illustrating an address map of ROM in the right-side CPU.

FIGS. 21A and 21B are address maps of the left-side CPU-ROM 1901-a and the right-side CPU-ROM 1901-b illustrated in FIG. 19, where 2100 indicates common program code for common processing serving as a base for both the image capturing plane AF and tracking processing handled by the left-side CPU 1006-a and the right-side CPU 1006-b. 2101-a indicates program code for phase difference AF, and 2101-b indicates program code for tracking.

The common program code 2100 and the program code for phase difference AF 2101-a are pre-stored in the left-side CPU-ROM 1901-a of FIG. 19, and the common program code 2100 and the program code for tracking 2101-b are pre-stored in the right-side CPU-ROM 1901-b.

This program code is pre-loaded into the command RAM 2001 of each CPU, as well as into the left-side CPU system memory 1900-a and the right-side CPU system memory 1900-b, during the operations by the left-side CPU 1006-a and the right-side CPU 1006-b.

Figure 23:
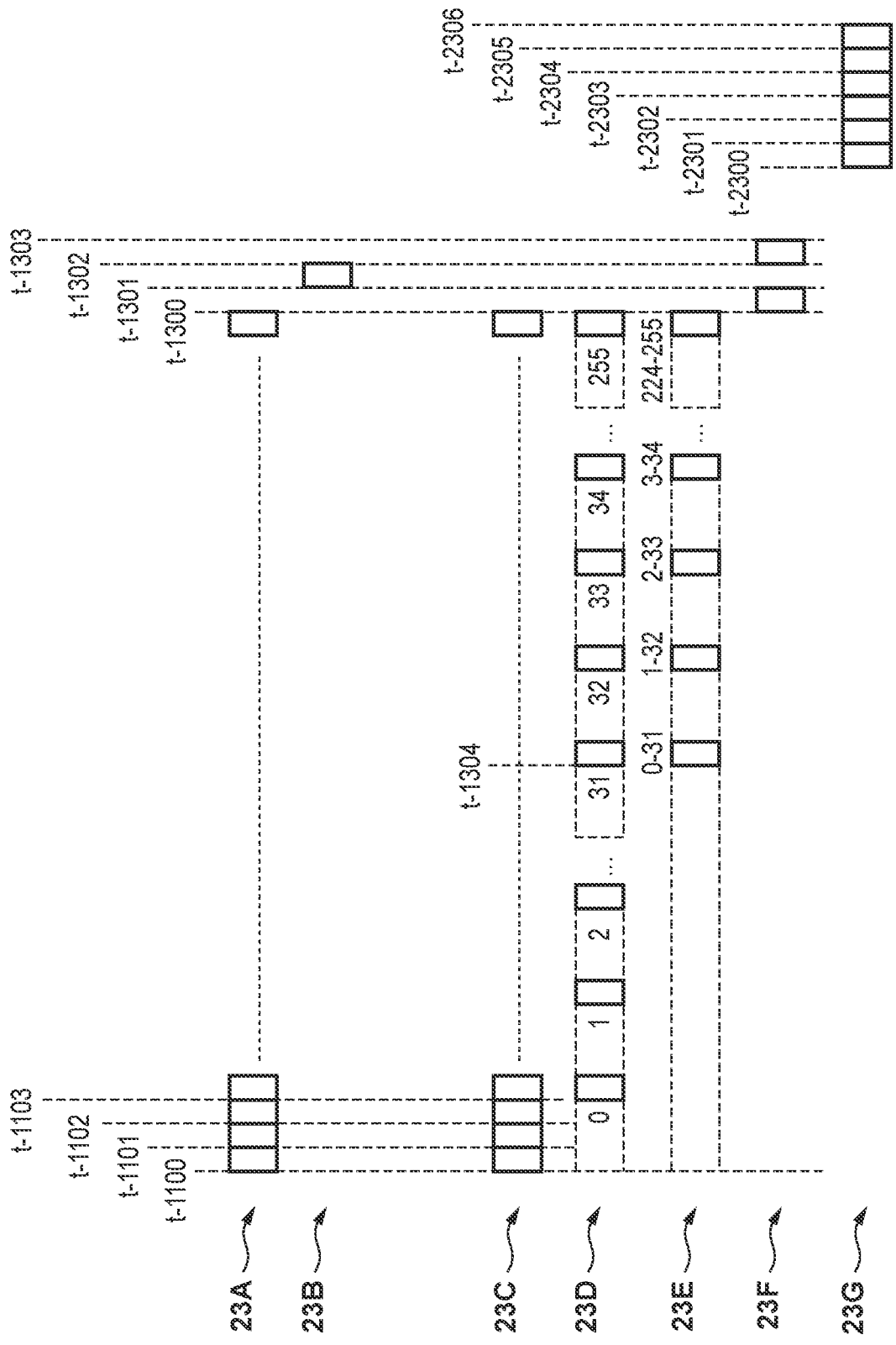
FIG. 23 is a processing timing chart of the left-side digital signal processing circuit and the right-side digital signal processing circuit.

The left-side CPU 1006-a and the right-side CPU 1006-b execute control processing, starting with setting parameters in the phase difference AF correlation computation unit 1005-a and the object tracking correlation computation unit 1005-b, according to the processing timing chart illustrated in FIG. 23, in accordance with the programs loaded into the command RAM 2001, the left-side CPU system memory 1900-a, and the right-side CPU system memory 1900-b.

FIG. 23 is a processing timing chart (illustrating one frame's worth of processing) of the left-side digital signal processing circuit 302-a and the right-side digital signal processing circuit 302-b illustrated in FIG. 3, according to the present third embodiment. Although the operations from (A) to (F) and t-1300 to t-1304 in FIG. 23 are the same as those described in the first embodiment, data access is executed in the data RAM 2003, the data cache 2004, the left-side CPU system memory 1900-a, and the right-side CPU system memory 1900-b, and program code access is executed in the command RAM 2001, the command cache 2002, the left-side CPU system memory 1900-a, and the right-side CPU system memory 1900-b, while those stated operations are carried out.

t-2300 at (G) in FIG. 23 indicates the timing at which the sensor logic function switching control signal S1800 is asserted. When, at this timing, the sensor logic function switching control signal S1800 is asserted from the sensor logic function switching control unit 1800 of FIG. 18, that signal is transmitted to the left-side CPU 1006-a and the right-side CPU 1006-b via the left-side CPU external interface circuit 1008-a, the left-side CPU bus arbitration circuit 1007-a, the CPU bus line 306, and the right-side CPU bus arbitration circuit 1007-b illustrated in FIG. 19.

After the sensor logic function switching control signal S1800 assertion timing t-2300 in FIG. 23, the left-side CPU 1006-a and the right-side CPU 1006-b carry out the following: as first processing, switching the content of the command cache, the data cache, and the data RAM of the left-side CPU 1006-a with the content of the command cache, the data cache, and the data RAM of the right-side CPU 1006-b; as second processing, moving template data for tracking from the right-side digital signal processing circuit 302-b to the left-side digital signal processing circuit 302-a; as third processing, reloading the program code for phase difference AF 2101-a of the left-side CPU-ROM 1901-a into the command RAM 2001 of the right-side CPU 1006-b; as fourth processing, reloading the program code for tracking 2101-b of the right-side CPU-ROM 1901-b into the command RAM 2001 of the left-side CPU 1006-a; and as fifth processing, restarting the program code in the left-side CPU 1006-a and the right-side CPU 1006-b. Through this, the phase difference AF function and the tracking function can be switched, and the command cache, data cache, data RAM, and template data for tracking from immediately before the sensor logic function switching control signal S1800 assertion timing t-2300 can be carried over.

Figure 22:
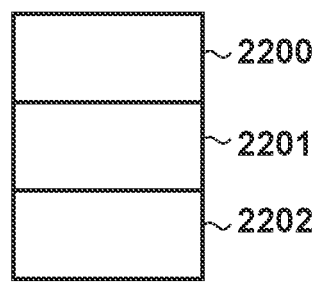
FIG. 22 is a diagram illustrating an address map when left and right functions are switched for system memory of the left-side CPU or system memory of the right-side CPU.

In the switching of the content of the command cache, the data cache, and the data RAM described in the foregoing first processing, a command cache buffer region 2200, a data cache buffer region 2201, and a data RAM buffer region 2202 are used as temporary storage regions, as indicated by the address map when switching the functions of the left-side CPU system memory 1900-*a* and the right-side CPU system memory 1900-*b*, illustrated in FIG. 22.

Additionally, the data switching, movement, and reloading described in the foregoing first to fourth processing are executed via the left-side CPU bus arbitration circuit 1007-*a*, the CPU bus line 306, the right-side CPU bus arbitration circuit 1007-*b*, the RAM communication data for AF S1900-*a*, the left-side CPU bus S1901-*a*, the left-side CPU system memory bus S1902-*a*, the left-side CPU-ROM bus S1903-*a*, the RAM communication data for tracking S1900-*b*, the right-side CPU bus S1901-*b*, the right-side CPU system memory bus S1902-*b*, and the right-side CPU-ROM bus S1903-*b* illustrated in FIG. 19.

Note that the data switching, movement, and reloading described in the foregoing first to fourth processing may use a data switching path (not shown) provided outside the stacked image sensor 102, via the left-side CPU external interface circuit 1008-*a* and the right-side CPU external interface circuit 1008-*b*.

In (G) of FIG. 23, t-2301 indicates the timing at which the temporary storage of the command cache, the data cache, and the data RAM of the left-side CPU 1006-*a* is complete; t-2302 indicates the timing at which the temporary storage of the command cache, the data cache, and the data RAM of the right-side CPU 1006-*b* is complete; t-2303 indicates the timing at which the movement of the template from the right-side digital signal processing circuit 302-*b* to the left-side digital signal processing circuit 302-*a* is complete; t-2304 indicates the timing at which the reloading is complete for the command RAM of the left-side CPU 1006-*a* and the right-side CPU 1006-*b*; t-2305 indicates the timing at which the reloading of the command cache, the data cache, and the data RAM of the left-side CPU 1006-*a* is complete; and t-2306 indicates the timing at which the reloading of the command cache, the data cache, and the data RAM of the right-side CPU 1006-*b* is complete.

In this manner, the process of switching the functions of the left and right digital signal processing circuits, indicated by 23G in FIG. 23, is executed each time one frame's worth of processing ends, and thus the processing handled by the left-side digital signal processing circuit 302-*a* and the right-side digital signal processing circuit 302-*b* of FIG. 19 can be switched with each frame.

Note that in the phase difference AF processing and tracking processing described in the first and third embodiments, when the number of pixels read out from the sensor is 8192 horizontal pixels by 2048 vertical pixels, the number of pixels in the resized image for tracking is 512 horizontal pixels by 256 vertical pixels, there are four evaluation bands for the phase difference AF processing, and there are 25 of both horizontal and vertical AF frames for a total of 625, the number of computations per frame is generally at a 10-to-1 ratio, with the phase difference AF processing having the higher computational amount. As such, if the functions are not switched as described above, the amount of heat produced by the left-side digital signal processing circuit 302-*a*, which carries out the phase difference AF processing, will increase greatly. However, the amount of heat produced can be suppressed by switching the processing handled by the left-side digital signal processing circuit 302-*a* and the right-side digital signal processing circuit 302-*b* of FIG. 19 with each frame as described above.

Fourth Embodiment

The present fourth embodiment will describe an example in which power consumption is leveled between the signal processing circuits with respect to time by switching the functions of a plurality of signal processing circuits and CPUs formed through stepping exposure during a flow for shooting a still image, using the object tracking/image plane phase difference AF of the first and third embodiments as an example.

Figure 24:
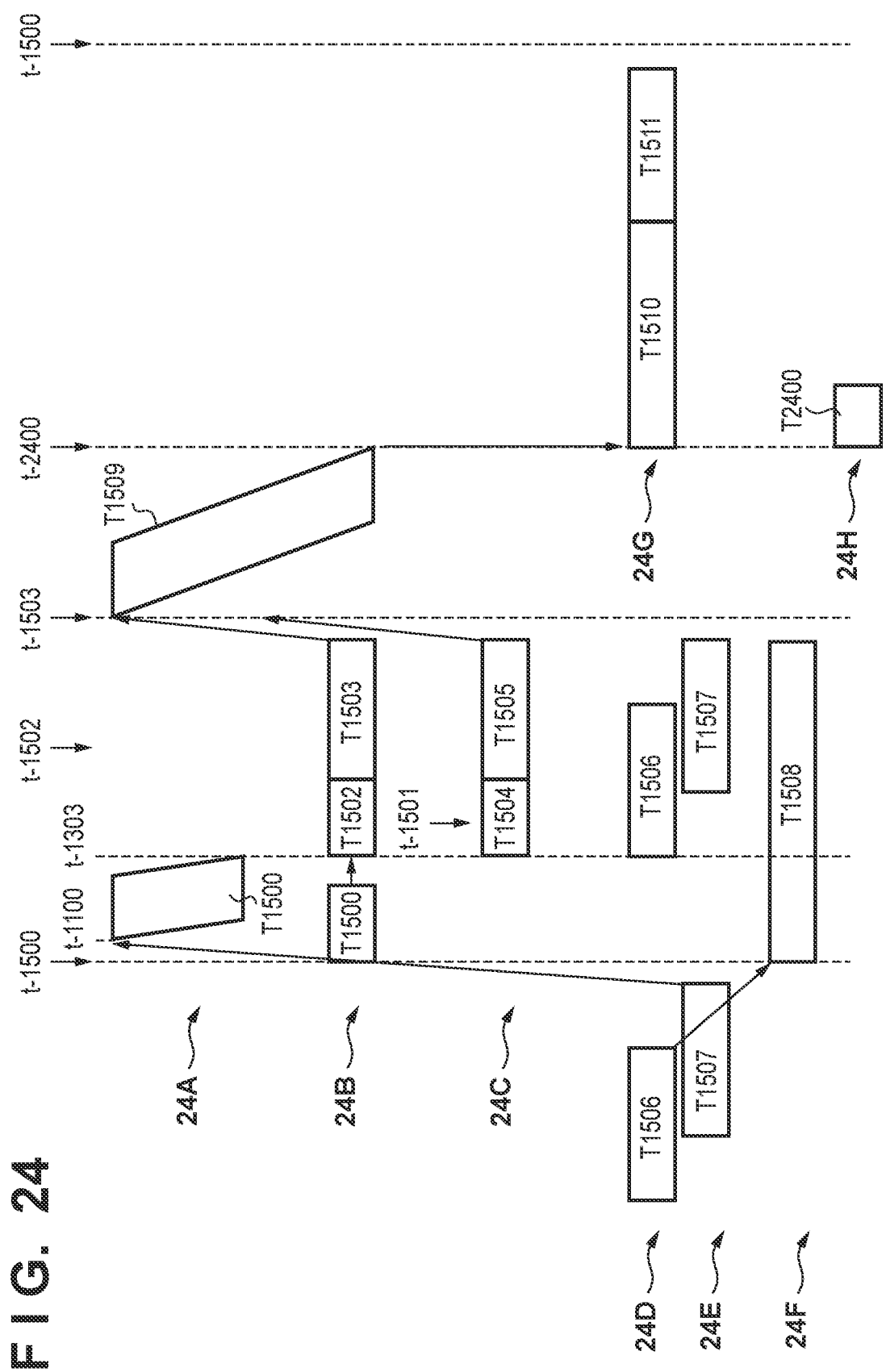
FIG. 24 is an operation sequence chart of an image sensor and an image recording apparatus according to a fourth embodiment.

24A in FIG. 24 indicates a sequence of image capturing output by the stacked image sensor 102, the image shift amount S111 output, and the object position and movement information S118 output; 24B, a sequence of defocus correction amount calculation, the defocus amount S113 calculation, and focus lens driving; and 24C, a sequence of imager IS control amount calculation and the sensor position drive signal S119 output. 24D indicates a sequence of generating the YUV image for display S106 and the YUV image for evaluation S107; 24E, a sequence of generating the object recognition information S116; 24F, a sequence of displaying a live view ("LV image" hereinafter); and 24G, a sequence of capturing and generating a still image and carrying out recording processing.

The foregoing are the same as the configurations and operations of 15A to 15F in FIG. 15, described with reference to the first embodiment, and will therefore not be described here.

24G in FIG. 24 indicates a sequence of processing for switching the functions of the left and right digital signal processing circuits. In 24H of FIG. 24, t-2400 indicates the sensor logic function switching control signal S1800 assertion timing, and T2400 indicates a sensor logic function switching period.

In this manner, once the still image capturing period T1509 by the stacked image sensor 102, which follows the timing t-1502 of instructing a still image to be shot (S2) during the LV image display, is complete, the still image processing period T1510 and the still image recording processing period T1511 are carried out by the image processing unit 110 and the recording signal processing unit 111, respectively, which corresponds to a non-operating period for the stacked image sensor 102. Thus by providing the sensor logic function switching control signal S1800 assertion timing t-2400 after the completion of the still image capturing period T1509, the functions of the left and right digital signal processing circuits can be switched as described in the third embodiment during the next LV image display period.

According to the present fourth embodiment, the sensor logic function switching is not carried out particularly during consecutive LV image display periods, which means that consecutive tracking processes can be carried out without interruption at high framerates, and the amounts of heat produced by the left and right digital signal processing circuits can be leveled when switching the sensor logic functions during still image shooting.

Fifth Embodiment

A fifth embodiment will describe an example in which, when continuous still image shooting is carried out through a sequence including three frames of LV image display and a subsequent one frame of still image shooting, the power consumption is leveled between the digital signal processing circuits by stopping the functions of the plurality of signal processing circuits and CPUs formed through stepping exposure only during a predetermined frame of the LV.

Reference sign 25A in FIG. 25 indicates a sequence of image output by the stacked image sensor 102, output of the image shift amount S111, and output of the object position and movement information S118, according to the fifth embodiment; 25B, the operating state of the left-side digital signal processing circuit 302-*a*; 25C, the operating state of the right-side digital signal processing circuit 302-*b*; and 25D, the sequence of the processing for switching the functions of the left and right digital signal processing circuits.

In the present fifth embodiment, with the left-side digital signal processing circuit 302-*a* indicated by 25B in FIG. 25, only the LV image display period for the frame immediately before the still image shooting is a phase difference AF function on period T2500, and the other LV image display periods are a phase difference AF function off period T2501. With the right-side digital signal processing circuit 302-*b* indicated by 25C, all the LV image display periods are a tracking function on period T2502.

Accordingly, the tracking function, which has a low computational amount, is carried out throughout all LV image display periods, whereas the phase difference AF function, which has a high computational amount, is operational only in the frame immediately before the still image is shot.

Like the fourth embodiment, providing the sensor logic function switching period T2400 during the still image shooting period makes it possible to switch the functions of the left and right digital signal processing circuits for the next LV image display and the shooting.

In the fifth embodiment, the tandem operations of the phase difference AF function and the tracking function described in the first embodiment are only carried out in the LV image display frame immediately before the still image shooting. However, control may be carried out to turn these functions on and off, switch the functions, and so on.

According to the present embodiment as described thus far, the plurality of digital signal processing circuits formed having the same configurations through stepping exposure handle mutually-different functions, and furthermore, the different functions can be integrated by the circuits referring to each others' processing results via a system bus constituted by interconnects formed by one-shot exposure. As a result, a function for obtaining an AF evaluation value as object tracking, for example, can be implemented within a stacked image sensor, which makes it possible to further increase the processing speed. Furthermore, the power consumption of the plurality of signal processing circuits can be leveled, which makes it possible to prevent differences from arising between the temperature-dependent characteristics (dark current noise) of the stacked pixel chips.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-127083, filed Jul. 8, 2019, which is hereby incorporated by reference herein in its entirety.

What is claimed is:

1. An integrated circuit chip comprising:
   a pixel circuit formed, as an image sensor, on a substrate stacked on the chip; and
   a logic circuit formed on another substrate stacked on the chip,
   wherein the logic circuit includes an input unit inputting signals from the pixel circuit, a plurality of signal processing circuits each of which performs a predetermined processing on signals input from the pixel circuit via the input unit, a bus shared by the plurality of signal processing circuits, an arbitration circuit that arbitrates between the plurality of signal processing circuits and the bus, where a portion of the bus is an internal bus for each of the signal processing circuits,
   wherein each of the plurality of signal processing circuits is formed by individual exposure, and the shared bus is formed by one shot exposure;
   wherein the plurality of signal processing circuits includes:
   a processing unit that generates a RAW image by carrying out predetermined signal processing on the signals input from the pixel circuit and outputs the RAW image to the exterior; and
   a generating unit that generates image evaluation information using the bus and the arbitration circuit, in addition to the generation of the RAW image.

2. The chip according to claim 1, wherein each of the plurality of signal processing circuits includes a CPU,
   wherein the bus includes a CPU bus, the CPU bus being accessible at least by each of the CPUs of the plurality of signal processing circuits, and
   wherein each of the plurality of signal processing circuits is provided with the arbitration circuit.

3. The chip according to claim 1, wherein each of the plurality of signal processing circuits includes a RAM,
   wherein the bus includes a memory bus, the memory bus being capable of sharing the RAM of the plurality of signal processing circuits, and
   wherein each of the plurality of signal processing circuits is provided with the arbitration circuit.

4. The chip according to claim 1, wherein
   at least one of the plurality of signal processing circuits includes an interface that is controlled from the exterior of the integrated circuit chip and an interface that outputs the image evaluation information to the exterior of the integrated circuit chip.

5. The chip according to claim 1, wherein the pixel circuit includes a plurality of photoelectric conversion elements to generate a captured image signal,
wherein the captured image signal is transmitted to the logic circuit.

6. An image capturing apparatus comprising:
an integrated circuit chip;
a lens unit including a focus lens for forming an image on a substrate included in the integrated circuit chip;
one or more processors;
a lens control unit that controls the focus lens;
an object recognizing unit that recognizes an object, including a position of the object, during shooting;
a detecting unit, including a gyrosensor, that detects movement of the apparatus;
an image processing unit and a recording signal processing unit; and
a display device and a recording medium,
wherein the integrated circuit chip includes a pixel circuit formed, as an image sensor, on the substrate stacked on the chip; and
a logic circuit formed on another substrate stacked on the chip, wherein the logic circuit includes an input unit inputting signals from the pixel circuit, a plurality of signal processing circuits each of which performs a predetermined processing on the signals input from the pixel circuit via the input unit, a bus shared by the plurality of signal processing circuits, an arbitration circuit that arbitrates between the plurality of signal processing circuits and the bus, where a portion of the bus is an internal bus for each of the signal processing circuits,
wherein each of the plurality of signal processing circuits is formed by individual stepping exposure, and the shared bus is formed by one shot exposure;
wherein the plurality of signal processing circuits includes:
a processing unit that generates a RAW image by carrying out predetermined signal processing on the signals input from the pixel circuit and outputs the RAW image to the exterior; and
a generating unit that generates image evaluation information using the bus and the arbitration circuit, in addition to the generation of the RAW image,
wherein the lens control unit, the object recognizing unit, the detecting unit, the image processing unit and the recording signal processing unit are implemented by the one or more processors.

7. An integrated circuit chip comprising:
a pixel circuit formed, as an image sensor, on a substrate stacked on the chip; and
a logic circuit formed on another substrate stacked on the chip,
wherein the logic circuit includes an input unit inputting signals from the pixel circuit, a plurality of signal processing circuits each of which performs a predetermined processing on the signals input from the pixel circuit via the input unit, a bus shared by the plurality of signal processing circuits, an arbitration circuit that arbitrates between the plurality of signal processing circuits and the bus, where a portion of the bus is an internal bus for each of the signal processing circuits,
wherein each of the plurality of signal processing circuits is formed by individual stepping exposure, and the shared bus is formed by one shot exposure;
wherein each of the plurality of signal processing circuits generates a RAW image by carrying out first signal processing on the signals input from the pixel circuit and outputs the RAW image to the exterior; and
wherein in addition to generating the RAW image, each of the plurality of signal processing circuits carries out second signal processing, the second signal processing being an evaluation of a plurality of different images, and in the second signal processing, an assignment of functions of the plurality of signal processing circuits is changed at a predetermined timing.

8. The chip according to claim 7, wherein the pixel circuit includes a plurality of photoelectric conversion elements to generate to a captured image signal,
wherein the captured image signal is transmitted to the logic circuit.

9. The chip according to claim 7, wherein the change of the assignment of the functions is executed by interchanging at least data and programs stored in memory among the plurality of signal processing circuits.

10. The chip according to claim 7,
wherein at least data and programs stored in memory are interchanged via the bus and the arbitration circuit.

11. An image capturing apparatus comprising:
an integrated circuit chip;
a lens unit including a focus lens for forming an image on a substrate included in the integrated circuit chip;
one or more processors;
a lens control unit that controls the focus lens;
an object recognizing unit that recognizes an object, including a position of the object, during shooting;
a detecting unit, including a gyrosensor, that detects movement of the apparatus;
an image processing unit and a recording signal processing unit; and
a display device and a recording medium, and
the integrated circuit chip includes:
a pixel circuit formed, as an image sensor, on the substrate stacked on the chip; and
a logic circuit formed on another substrate stacked on the chip,
wherein the logic circuit includes an input unit inputting signals from the pixel circuit, a plurality of signal processing circuits each of which performs a predetermined processing on the signals input from the pixel circuit via the input unit, a bus shared by the plurality of signal processing circuits, an arbitration circuit that arbitrates between the plurality of signal processing circuits and the bus, where a portion of the bus is an internal bus for each of the signal processing circuits,
wherein each of the plurality of signal processing circuits is formed by individual stepping exposure, and the shared bus is formed by one shot exposure;
wherein each of the plurality of signal processing circuits generates a RAW image by carrying out first signal processing on the signals input from the pixel circuit and outputs the RAW image to the exterior; and
wherein in addition to generating the RAW image, each of the plurality of signal processing circuits carries out second signal processing, the second signal processing being an evaluation of a plurality of different images, and in the second signal processing, an assignment of functions of the plurality of signal processing circuits is changed at a predetermined timing,
wherein the lens control unit, the object recognizing unit, the detecting unit, the image processing unit and the recording signal processing unit are implemented by the one or more processors.

12. The apparatus according to claim 11, wherein the changing of the assignment of functions is carried out between frames.

13. The apparatus according to claim 11, wherein the changing of the assignment of functions is carried out between live view shooting and still image shooting when continuous shooting of still images is carried out.

* * * * *